(12) United States Patent
Hasegawa

(10) Patent No.: US 10,307,847 B2
(45) Date of Patent: Jun. 4, 2019

(54) WIRE ELECTRIC DISCHARGE MACHINE HAVING CORNER SHAPE CORRECTING FUNCTION

(71) Applicant: FANUC Corporation, Yamanashi (JP)

(72) Inventor: Yasuo Hasegawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 67 days.

(21) Appl. No.: 14/938,851

(22) Filed: Nov. 12, 2015

(65) Prior Publication Data

US 2016/0136745 A1  May 19, 2016

(30) Foreign Application Priority Data

Nov. 19, 2014 (JP) .................................. 2014-234581
Oct. 5, 2015 (JP) .................................. 2015-197936

(51) Int. Cl.
*B23H 7/06* (2006.01)
*B23H 7/08* (2006.01)
(Continued)

(52) U.S. Cl.
CPC .............. *B23H 7/065* (2013.01); *B23H 1/02* (2013.01); *B23H 7/08* (2013.01); *B23H 7/20* (2013.01);
(Continued)

(58) Field of Classification Search
CPC . B23H 1/02; B23H 7/065; B23H 7/08; B23H 7/20; B23H 7/26; G05B 2219/45043
(Continued)

(56) References Cited

U.S. PATENT DOCUMENTS

| 4,518,842 A | 5/1985 | Obara |
| 5,006,691 A * | 4/1991 | Nakayama ............. B23H 7/065 |
| | | 219/69.12 |

(Continued)

FOREIGN PATENT DOCUMENTS

| CN | 202438757 U | 9/2012 |
| CN | 103391827 A | 11/2013 |

(Continued)

OTHER PUBLICATIONS

Office Action in JP application No. 2015-197936, dated Mar. 8, 2016.

(Continued)

*Primary Examiner* — Tu B Hoang
*Assistant Examiner* — Diallo I Duniver
(74) *Attorney, Agent, or Firm* — Hauptman Ham, LLP

(57) ABSTRACT

A wire electric discharge machine has a function of performing correction of corner shapes independently on an upper surface and a lower surface of workpiece. On the basis of the positions of upper and lower wire guides and the position and the thickness of the workpiece, the wire electric discharge machine calculates, on the upper and lower surfaces of the workpiece, a shape correction amount in a state in which there is a space between the upper nozzle and the upper surface of the workpiece and also in which there is a space between the lower nozzle and the lower surface of the workpiece, from a correction amount at the time when nozzles of the upper and lower wire guides are closely attached to the upper and lower surfaces of the workpiece. The wire electric discharge machine performs shape correction according to the calculated shape correction amount.

13 Claims, 15 Drawing Sheets

(51) Int. Cl.
*B23H 7/26* (2006.01)
*B23H 1/02* (2006.01)
*B23H 7/20* (2006.01)

(52) U.S. Cl.
CPC ..... *B23H 7/26* (2013.01); *G05B 2219/45043* (2013.01)

(58) Field of Classification Search
USPC ................................. 219/69.12, 69.11–69.14
See application file for complete search history.

(56) References Cited

U.S. PATENT DOCUMENTS

| | | | |
|---|---|---|---|
| 5,756,954 | A | 5/1998 | Kamiguchi et al. |
| 6,252,191 | B1 * | 6/2001 | D'Amario ............... B23H 7/04 219/69.12 |
| 7,371,989 | B2 * | 5/2008 | Miyajima ............. B23H 7/065 219/69.12 |
| 2002/0008085 | A1 | 1/2002 | Tsukamoto |
| 2004/0084419 | A1 * | 5/2004 | Kato ..................... B23H 7/065 219/69.12 |
| 2006/0102596 | A1 * | 5/2006 | Kinoshita ............... B23H 7/04 219/69.12 |
| 2007/0221023 | A1 * | 9/2007 | Yoshida .................. B23H 5/04 83/53 |
| 2012/0223055 | A1 * | 9/2012 | Kawahara ............. B23H 7/065 219/69.12 |
| 2013/0238114 | A1 | 9/2013 | Hiraga et al. |
| 2013/0325164 | A1 | 12/2013 | Wwatanabe et al. |
| 2014/0116991 | A1 | 5/2014 | Sugie et al. |
| 2014/0175063 | A1 | 6/2014 | Niu et al. |
| 2014/0197138 | A1 | 7/2014 | Yoshizaki et al. |

FOREIGN PATENT DOCUMENTS

| | | |
|---|---|---|
| JP | 58-120428 A | 7/1983 |
| JP | 7-24645 A | 1/1995 |
| JP | 8-39356 A | 2/1996 |
| JP | 11-221719 A | 8/1999 |
| JP | 2000-218440 A | 8/2000 |
| JP | 2001-259930 A | 9/2001 |
| JP | 2008-36720 A | 2/2008 |
| JP | 2011-235405 A | 11/2011 |
| JP | 2012-179705 A | 9/2012 |
| JP | 2013-190854 A | 9/2013 |
| JP | 2014-121755 A | 7/2014 |
| JP | 2014-133293 A | 7/2014 |
| WO | 2014/068681 A1 | 5/2014 |

OTHER PUBLICATIONS

Extended European Search Report in EP application No. 15193336.3, dated Apr. 6, 2016.

Fuzhu Han et al., "Corner error simulation of rough cutting in wire EDM", Precision Engineering, Aug. 10, 2007, pp. 331-336, vol. 31, No. 4, Elsevier, Amsterdam NL.

Jose Antonio Sanchez et al., "A computer-aided system for the optimization of the accuracy of the wire electro-discharge machining process", International Journal of Computer Integrated Manufacturing, Jul. 1, 2014, vol. 17, No. 5, pp. 413-420.

Office Action in CN Application No. 201510796285.9, dated Jun. 28, 2017.

* cited by examiner

FIG.3
THICKNESS T OF WORKPIECE = 10
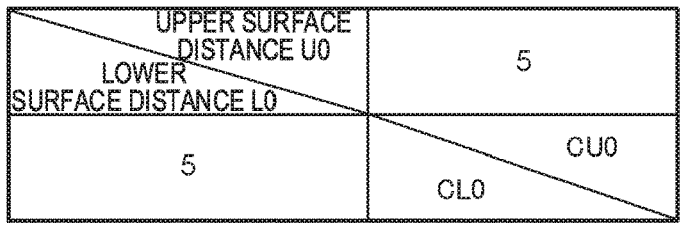
THICKNESS T OF WORKPIECE = 20
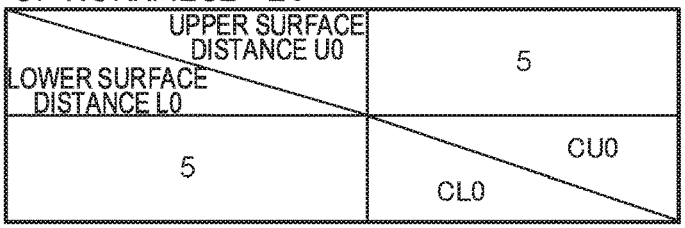
THICKNESS T OF WORKPIECE = 30
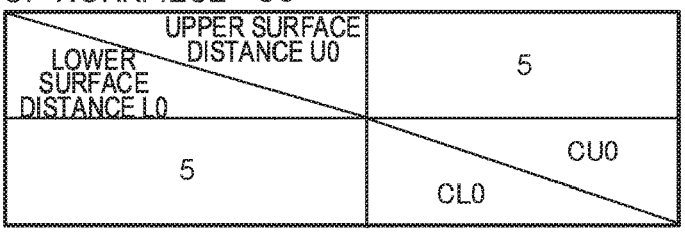
THICKNESS T OF WORKPIECE = 40
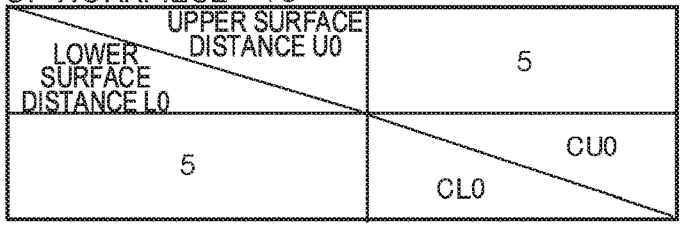
FIG.7
WIRE DISPLACEMENT AMOUNT BY WORKPIECE POSITION
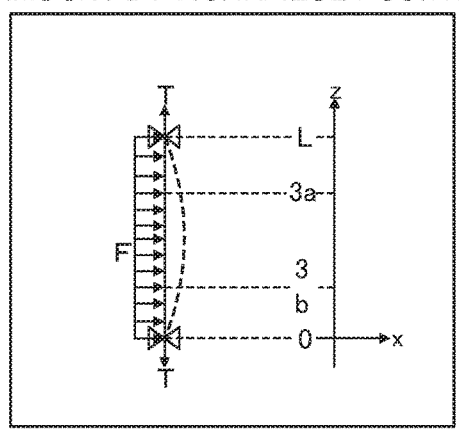

FIG.10

CORRECTION AMOUNT DURING UPPER PART OPENING(mm)

| UPPER NOZZLE GAP | UPPER SURFACE CORRECTION AMOUNT | LOWER SURFACE CORRECTION AMOUNT |
|---|---|---|
| 0.2 | 0.05 | 0.05 |
| 5 | 0.06 | 0.04 |
| 10 | 0.07 | 0.04 |
| 20 | 0.08 | 0.03 |
| 30 | 0.10 | 0.03 |
| 40 | 0.12 | 0.03 |
| 50 | 0.14 | 0.03 |
| 70 | 0.17 | 0.03 |
| 100 | 0.20 | 0.03 |

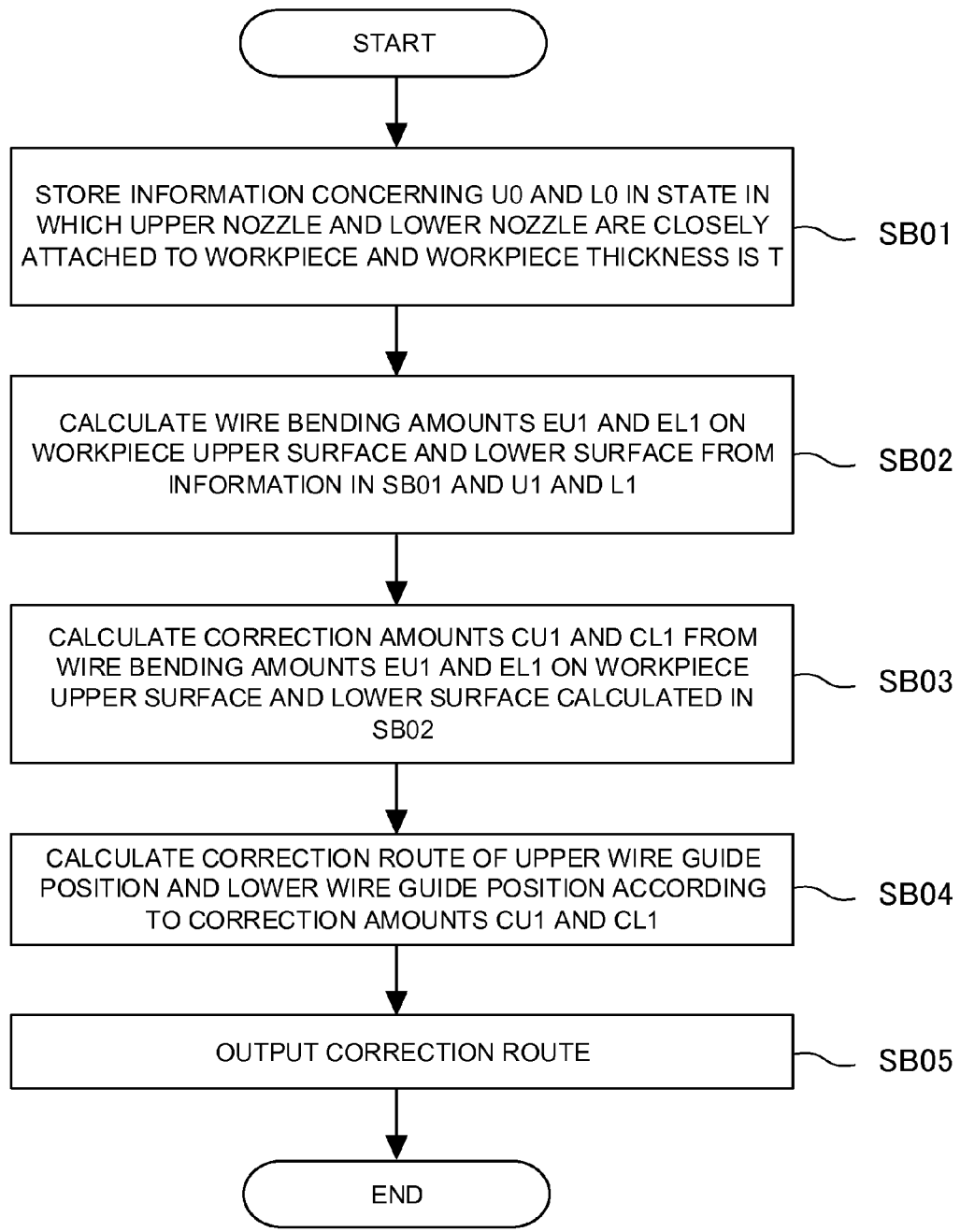

FIG.14

THICKNESS T OF WORKPIECE = 10

| LOWER SURFACE DISTANCE L1 \ UPPER SURFACE DISTANCE U1 | 5 | 10 | 20 | 30 | |
|---|---|---|---|---|---|
| 5 | CL1 / CU1 | CL1 / CU1 | CL1 / CU1 | CL1 / CU1 | |
| 10 | CL1 / CU1 | CL1 / CU1 | CL1 / CU1 | CL1 / CU1 | |
| 20 | CL1 / CU1 | CL1 / CU1 | CL1 / CU1 | CL1 / CU1 | |
| 30 | CL1 / CU1 | CL1 / CU1 | CL1 / CU1 | CL1 / CU1 | |
| | | | | | |

THICKNESS T OF WORKPIECE = 10

| LOWER SURFACE DISTANCE L1 \ UPPER SURFACE DISTANCE U1 | 5 | 10 | 20 | 30 | |
|---|---|---|---|---|---|
| 5 | CL1 / CU1 | CL1 / CU1 | CL1 / CU1 | CL1 / CU1 | |
| 10 | CL1 / CU1 | CL1 / CU1 | CL1 / CU1 | CL1 / CU1 | |
| 20 | CL1 / CU1 | CL1 / CU1 | CL1 / CU1 | CL1 / CU1 | |
| 30 | CL1 / CU1 | CL1 / CU1 | CL1 / CU1 | CL1 / CU1 | |
| | | | | | |

THICKNESS T OF WORKPIECE = 10

| LOWER SURFACE DISTANCE L1 \ UPPER SURFACE DISTANCE U1 | 5 | 10 | 20 | 30 | |
|---|---|---|---|---|---|
| 5 | CL1 / CU1 | CL1 / CU1 | CL1 / CU1 | CL1 / CU1 | |
| 10 | CL1 / CU1 | CL1 / CU1 | CL1 / CU1 | CL1 / CU1 | |
| 20 | CL1 / CU1 | CL1 / CU1 | CL1 / CU1 | CL1 / CU1 | |
| 30 | CL1 / CU1 | CL1 / CU1 | CL1 / CU1 | CL1 / CU1 | |
| | | | | | |

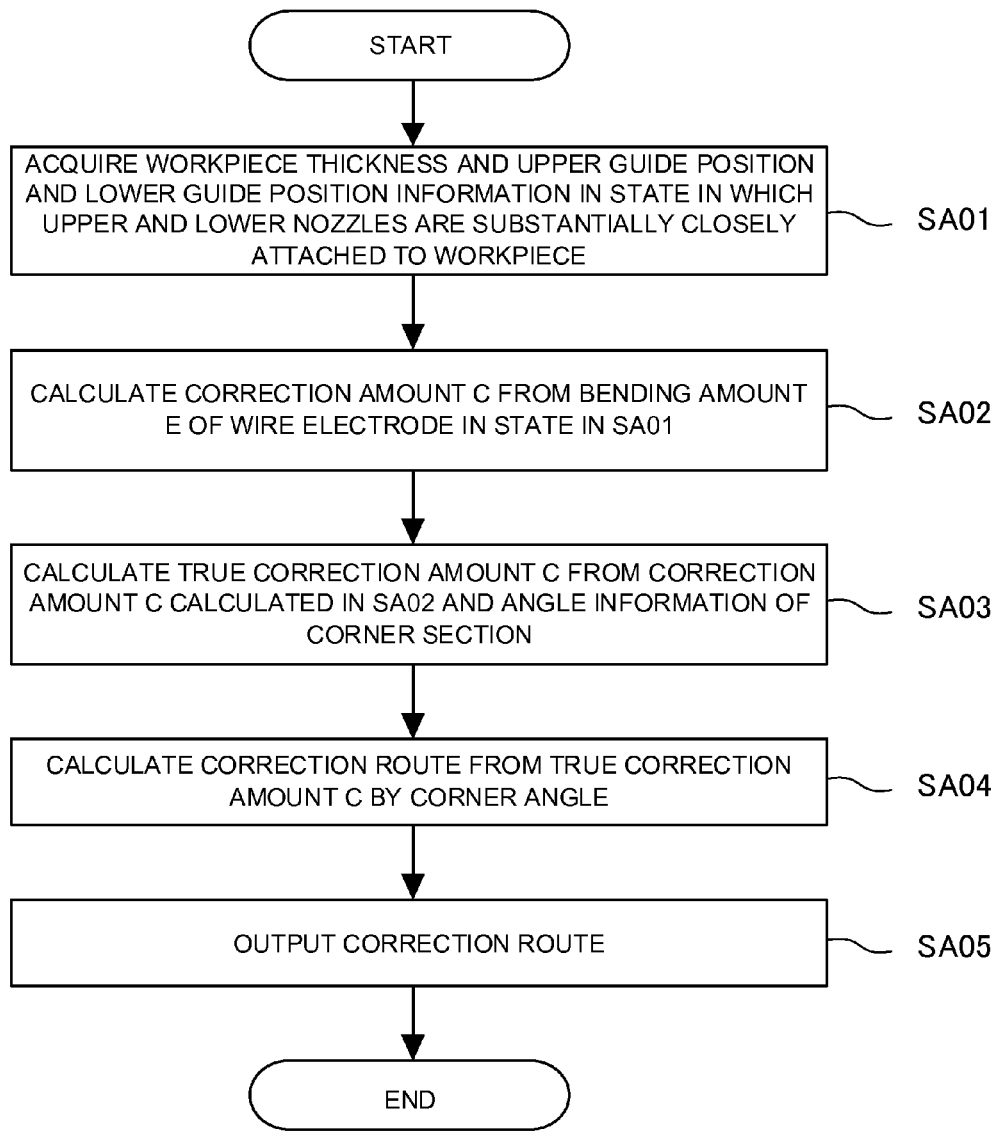

WIRE ELECTRIC DISCHARGE MACHINE HAVING CORNER SHAPE CORRECTING FUNCTION

RELATED APPLICATIONS

The present application claims priority to Japanese Application Number 2014-234581, filed Nov. 19, 2014, and Japanese Application Number 2015-197936 filed on Oct. 5, 2015, the disclosures of which are hereby incorporated by reference herein in their entirety.

BACKGROUND OF THE INVENTION

1. Field of the Invention

The present invention relates to a wire electric discharge machine and, more particularly, to a wire electric discharge machine capable of reducing a shape error due to bending of a wire electrode on the upper and lower surfaces of workpiece and attaining improvement in shape accuracy of the workpiece by correcting, independently in an upper guide section and a lower guide section, the positions of upper and lower wire guides in a relative movement command of a wire guide with respect to the workpiece commanded by a machining program.

2. Description of the Related Art

In wire electric discharge machining, it is known that a wire electrode bends in the opposite direction of a machining progress direction or a direction at a fixed angle from the machining progress direction because of a discharge repulsion force that occurs between the wire electrode and a workpiece, a turbulent flow of machining liquid, or the like. When workpiece is linearly machined by the wire electrode, although bending of the wire electrode occurs in a direction opposite to the machining progress direction, the bending of the wire electrode does not affect a machining shape. However, large influence of the bending of the wire electrode appears in machining of a corner section machined at a predetermined angle set in a machining program and greatly deteriorates shape accuracy of the corner section. So-called "corner sagging" occurs. An intended machined shape is not obtained.

FIG. 18 is a diagram for explaining machining of a corner section. In the wire electric discharge machining, in order to machine workpiece 3 in dimensions as desired, in general, an offset route is created by adding the radius of a wire electrode 4 and a discharge gap to dimensions of an actual product shape and the wire electrode 4 is moved along the created offset route (a machining route 5). Note that a value obtained by adding up the radius of the wire electrode 4 and the discharge gap is referred to as offset value.

As shown in FIG. 18, since the wire electrode 4 bends in a corner section of the workpiece 3, the wire electrode 4 does not move along the machining route 5 and moves on the inner side of the machining route (see a track 6a of the wire electrode indicated by a broken line). As a result, the wire electrode 4 excessively machines the workpiece 3. Therefore, so-called "corner sagging" (see corner sagging 7 due to bending of the wire electrode) is formed. A desired machining finish shape is not obtained. So, various measures have been proposed to cope with such a problem.

Japanese Patent Application Laid-Open No. 58-120428, Japanese Patent Application Laid-Open No. 8-39356, and Japanese Patent Application Laid-Open No. 7-24645 mention that a shape failure due to corner sagging is reduced by reducing machining energy when a wire electrode passes a corner section, minimizing bending of the wire electrode, and causing the wire electrode to pass the corner section.

In the machining method, the machining energy is reduced, that is, machining speed is reduced until the bending of the wire electrode decreases. The corner section is machined slowly. Therefore, there is a disadvantage that a machining time is long.

Japanese Patent Application Laid-Open No. 8-39356, Japanese Patent Application Laid-Open No. 7-24645, Japanese Patent Application Laid-Open No. 11-221719, and Japanese Patent Application Laid-Open No. 2013-190854 mention that, when a wire electrode passes a corner section, bending of the wire electrode is corrected from a machining route and a so-called go-too-far and return route is given to the wire electrode to correct a shape error due to the bending of the wire electrode. In the machining method, since deceleration is not performed unlike the machining method explained above, a machining time is not excessively long.

As shown in FIG. 19, when the machining route 5 of the wire electrode 4 is corrected by a correction route 8 to perform the wire electric discharge machining, the wire electrode 4 moves along a wire electrode track 6b. Consequently, it is possible to prevent the workpiece 3 from being excessively machined.

FIG. 20 is a flowchart of processing for calculating and outputting a correction route on the basis of the distance between upper and lower wire guides according to the related art. In this processing, correction is not performed independently in the upper and lower wire guides.

Information concerning the thickness of workpiece and an upper wire guide position and a lower wire guide position in a state in which upper and lower nozzles are closely attached to the workpiece is acquired (step SA01). A correction amount C is calculated according to a bending amount E of a wire electrode in the state in which the upper and lower nozzles are closely attached to the workpiece (step SA02). A true correction amount C is calculated from the calculated correction amount C and angle information of a corner section (step SA03). A correction route is calculated on the basis of the calculated true correction amount C (step SA04). The calculated correction route is output (step SA05). Then, this processing is ended.

In the measures of both of Japanese Patent Application Laid-Open No. 7-24645 and Japanese Patent Application Laid-Open No. 11-221719, it is assumed that relative positional relations between the positions of the upper and lower wire guides for supporting the wire electrode and the upper surface and the lower surface of the workpiece (i.e., a gap between the upper guide position and the upper surface of the workpiece and a gap between the lower guide position and the lower surface of the workpiece) are substantially the same distances and wire bending amounts are substantially the same on the upper surface and the lower surface of the workpiece in a state in which the upper and lower nozzles for ejecting the machining liquid are closely attached to the workpiece upper and lower surfaces. It is assumed that correction amounts for shape correction are also the same on the upper surface and the lower surface. That is, the shape correction is performed according to X and Y axes on a two-dimensional plane.

However, machining by the wire electric discharge machine is not always machining in which the guide sections and the nozzles are closely attached to the upper and lower surfaces of the workpiece. For example, in some case, the lower surface of the workpiece is fixed on a fixed table (closely attached to the fixed table) and, on the other hand, the upper guide section is greatly apart from the workpiece upper surface because of a fixing jig or other reasons.

When the upper guide section for supporting the wire electrode is greatly apart from the workpiece upper surface and the lower guide section for supporting the wire electrode is closely attached to the workpiece lower surface, on the workpiece lower surface, a shape correction amount in the corner section may be the correction amount itself, that is, a shape correction block. However, on the workpiece upper surface, bending due to vibration of the wire electrode further increases. Therefore, correction of the workpiece upper surface is not correctly performed even if the shape of the workpiece lower surface is corrected. Consequently, improvement of shape accuracy of a machining shape of the workpiece is insufficient.

SUMMARY OF THE INVENTION

Therefore, it is an object of the present invention to provide a wire electric discharge machine capable of eliminating, on upper and lower surfaces of workpiece, a machining shape error of the workpiece caused by bending of a wire electrode by correcting the positions of upper and lower wire guides, which guide the wire electrode, independently on the workpiece upper and lower surfaces from a program route and attaining improvement of shape accuracy in corner sections of the workpiece upper and lower surfaces.

The wire electric discharge machine according to the present invention stretches the wire electrode between the upper and lower wire guides and relatively moves the wire electrode with respect to the workpiece on the basis of a machining program to perform electric discharge machining.

A wire electric discharge machine according to a first aspect of the present invention includes: a reference-position storing unit configured to store, as a reference position, relative positions in a workpiece thickness direction of upper and lower wire guides with respect to workpiece upper and lower surfaces and the thickness of workpiece in a state in which the upper and lower wire guides respectively approach the upper and lower surfaces of the workpiece; a correction-amount storing unit configured to store correction amounts for correcting shift amounts between wire guide coordinate positions on a machining program route in the reference position and actual machining positions on the workpiece upper and lower surfaces, with the shift being caused by wire bending during machining; a setting unit configured to set relative positions in the workpiece thickness direction of the upper and lower wire guides with respect to the workpiece upper and lower surfaces in any upper and lower wire guide positions and the thickness of the workpiece; a correction-amount calculating unit configured to calculate, on the basis of the reference position stored in the reference-position storing unit and the correction amounts stored in the correction-amount storing unit, correction amounts for correcting the respective shift amounts in the relative positions in the workpiece thickness direction of the upper and lower wire guides with respect to the workpiece upper and lower surfaces and the thickness of the workpiece set by the setting unit; and a wire-guide-position correcting unit configured to correct, on the basis of the correction amounts calculated by the correction-amount calculating unit, independently in an upper guide section and a lower guide section, the positions of the upper and lower wire guides in a relative movement command of a wire guide with respect to the workpiece commanded by the machining program.

A wire electric discharge machine according to a second aspect of the present invention includes: a reference-position storing unit configured to store, as reference positions, a plurality of sets of relative positions in a workpiece thickness direction of upper and lower wire guides with respect to workpiece upper and lower surfaces and the thickness of workpiece; a correction-amount storing unit configured to store correction amounts for correcting shift amounts between wire guide coordinate positions on a machining program route in a plurality of the reference positions and actual machining positions on the workpiece upper and lower surfaces, with the shift being caused by wire bending during machining; a setting unit configured to set relative positions in the workpiece thickness direction of the upper and lower wire guides with respect to the workpiece upper and lower surfaces in any upper and lower wire guide positions and the thickness of the workpiece; a selecting unit configured to select, from the sets of the relative positions in the workpiece thickness direction of the upper and lower wire guides with respect to the workpiece upper and lower surfaces and the thickness of the workpiece stored in the reference-position storing unit, a plurality of sets of those close to the relative positions in the workpiece thickness direction of the upper and lower wire guides with respect to the workpiece upper and lower surfaces and the thickness of the workpiece set by the setting unit; a correction-amount calculating unit configured to calculate, on the basis of the plurality of reference positions in the plurality of sets selected by the selecting unit and the correction amounts stored in the correction-amount storing unit, correction amounts for correcting the respective shift amounts in the relative positions in the workpiece thickness direction of the upper and lower wire guides with respect to the workpiece upper and lower surfaces and the thickness of the workpiece set by the setting unit; and a wire-guide-position correcting unit configured to correct, on the basis of the correction amounts calculated by the correction-amount calculating unit, independently in an upper guide section and a lower guide section, the positions of the upper and lower wire guides in a relative movement command of a wire guide with respect to the workpiece commanded by the machining program.

A wire electric discharge machine according to a third aspect of the present invention includes: a reference-position storing unit configured to store, as reference positions, a plurality of sets of relative positions in workpiece thickness direction of upper and lower wire guides with respect to workpiece upper and lower surfaces and the thickness of workpiece; a correction-amount storing unit configured to store correction amounts for correcting shift amounts between wire guide coordinate positions on a machining program route in a plurality of the reference positions and actual machining positions on the workpiece upper and lower surfaces, with the shift being caused by wire bending during machining; a setting unit configured to set relative positions in the workpiece thickness direction of the upper and lower wire guides with respect to the workpiece upper and lower surfaces in any upper and lower wire guide positions and the thickness of the workpiece; a correction-amount invoking unit configured to invoke, from the plurality of reference positions stored in the reference-position storing unit and the correction amounts stored in the correction-amount storing unit, correction amounts for correcting the respective shift amounts in the relative positions in the workpiece thickness direction of the upper and lower wire guides with respect to the workpiece upper and lower surfaces and the thickness of the workpiece set by the setting unit; and a wire-guide-position correcting unit configured to correct, on the basis of the correction amounts invoked by the correction-amount invoking unit, independently in an upper guide section and a lower guide section, the positions of the upper and lower wire guides in a relative movement command of a wire guide with respect to the workpiece commanded by the machining program.

A wire electric discharge machine according to a fourth aspect of the present invention includes: a reference-position storing unit configured to store, as a reference position, relative positions in a workpiece thickness direction of upper and lower wire guides with respect to workpiece upper and lower surfaces and the thickness of workpiece in a state in which the upper and lower wire guides respectively approach the upper and lower surfaces of the workpiece; a shift-amount storing unit configured to store shift amounts between wire guide coordinate positions on a machining program route in the reference position and actual machining positions on the workpiece upper and lower surfaces, with the shift being caused by wire bending during machining; a correction-amount calculating unit configured to calculate correction amounts from the shift amounts stored in the shift-amount storing unit; a setting unit configured to set relative positions in the workpiece thickness direction of the upper and lower wire guides with respect to the workpiece upper and lower surfaces in any upper and lower wire guide positions and the thickness of the workpiece; a correction-amount calculating unit configured to calculate, on the basis of the reference position stored in the reference-position storing unit and the correction amounts calculated by the correction-amount calculating unit, correction amounts for correcting the respective shift amounts in the relative positions in the workpiece thickness direction of the upper and lower wire guides with respect to the workpiece upper and lower surfaces and the thickness of the workpiece set by the setting unit; and a wire-guide-position correcting unit configured to correct, on the basis of the correction amounts calculated by the correction-amount calculating unit, independently in an upper guide section and a lower guide section, the positions of the upper and lower wire guides in a relative movement command of a wire guide with respect to the workpiece commanded by the machining program.

A wire electric discharge machine according to a fifth aspect of the present invention includes: a reference-position storing unit configured to store, as reference positions, a plurality of sets of relative positions in a workpiece thickness direction of upper and lower wire guides with respect to workpiece upper and lower surfaces and the thickness of workpiece; a shift-amount storing unit configured to store shift amounts between wire guide coordinate positions on a machining program route in a plurality of the reference positions and actual machining positions on the workpiece upper and lower surfaces, with the shift being caused by wire bending during machining; a correction-amount calculating unit configured to calculate correction amounts from the shift amounts stored in the shift-amount storing unit; a setting unit configured to set relative positions in the workpiece thickness direction of the upper and lower wire guides with respect to the workpiece upper and lower surfaces in any upper and lower wire guide positions and the thickness of the workpiece; a selecting unit configured to select, from the sets of the relative positions in the workpiece thickness direction of the upper and lower wire guides with respect to the workpiece upper and lower surfaces and the thickness of the workpiece stored in the reference-position storing unit, a plurality of sets of those close to the relative positions in the workpiece thickness direction of the upper and lower wire guides with respect to the workpiece upper and lower surfaces and the thickness of the workpiece set by the setting unit; a correction-amount calculating unit configured to calculate, on the basis of the plurality of reference positions in the plurality of sets selected by the selecting unit and the correction amounts stored in the correction-amount storing unit, correction amounts for correcting the respective shift amounts in the relative positions in the workpiece thickness direction of the upper and lower wire guides with respect to the workpiece upper and lower surfaces and the thickness of the workpiece set by the setting unit; and a wire-guide-position correcting unit configured to correct, on the basis of the correction amounts calculated by the correction-amount calculating unit, independently in an upper guide section and a lower guide section, the positions of the upper and lower wire guides in a relative movement command of a wire guide with respect to the workpiece commanded by the machining program.

A wire electric discharge machine according to a sixth aspect of the present invention includes: a reference-position storing unit configured to store, as reference positions, a plurality of sets of relative positions in workpiece thickness direction of upper and lower wire guides with respect to workpiece upper and lower surfaces and the thickness of workpiece; a shift-amount storing unit configured to store shift amounts between wire guide coordinate positions on a machining program route in a plurality of the reference positions and actual machining positions on the workpiece upper and lower surfaces, with the shift being caused by wire bending during machining; a correction-amount calculating unit configured to calculate correction amounts from the shift amounts stored in the shift-amount storing unit; a setting unit configured to set relative positions in the workpiece thickness direction of the upper and lower wire guides with respect to the workpiece upper and lower surfaces in any upper and lower wire guide positions and the thickness of the workpiece; a correction-amount invoking unit configured to invoke, from the plurality of reference positions stored in the reference-position storing unit and the correction amounts calculated by the correction-amount calculating unit, correction amounts for correcting the respective shift amounts in the relative positions in the workpiece thickness direction of the upper and lower wire guides with respect to the workpiece upper and lower surfaces and the thickness of the workpiece set by the setting unit; and a wire-guide-position correcting unit configured to correct, on the basis of the correction amounts invoked by the correction-amount invoking unit, independently in an upper guide section and a lower guide section, the positions of the upper and lower wire guides in a relative movement command of a wire guide with respect to the workpiece commanded by the machining program.

The reference-position storing unit can be configured to store a plurality of sets of the positions of the upper and lower wire guides and the relative positions in the workpiece thickness direction of the upper and lower wire guides with respect to the workpiece upper and lower surfaces instead of storing the plurality of sets of the relative positions in the workpiece thickness direction of the upper and lower wire guides with respect to the workpiece upper and lower surfaces.

According to the present invention, it is possible to provide a wire electric discharge machine capable of eliminating, on upper and lower surfaces of workpiece, a machining shape error of the workpiece caused by bending of a wire electrode by correcting the positions of upper and lower wire guides, which guide the wire electrode, independently on the workpiece upper and lower surfaces from a program route and attaining improvement of shape accuracy in corner sections of the workpiece upper and lower surfaces.

BRIEF DESCRIPTION OF THE DRAWINGS

The objects and features described above and other objects and features of the present invention will be made apparent from the following explanation of embodiments with reference to the accompanying drawings, among the figures:

FIG. 3 is a diagram showing a table for storing, by changing workpiece thickness, in a storage device, as a set of reference positions, the workpiece thickness, a relative position in a workpiece thickness direction with respect to the upper surface of the workpiece, and a relative position in the workpiece thickness direction with respect to the lower surface of the workpiece;

FIG. 7 is a diagram for explaining a displacement amount of the wire electrode due to a workpiece position;

FIG. 10 is a diagram showing a correction amount during upper part opening when the upper nozzle section is separated from the workpiece upper surface;

FIG. 13 is a flowchart showing processing in performing correction independently in upper and lower guides according to the distance between the upper and lower guides;

FIG. 14 is a diagram for explaining that a plurality of sets of relative positions of upper and lower wire guides in the workpiece thickness direction with respect to the workpiece upper and lower surfaces and the workpiece thickness are stored as reference positions and correction amounts in the reference positions are stored;

FIG. 20 is a flowchart for explaining processing in not performing correction independently in upper and lower guides according to the distance between the upper and lower guides.

DESCRIPTION OF THE PREFERRED EMBODIMENTS

Figure 1:
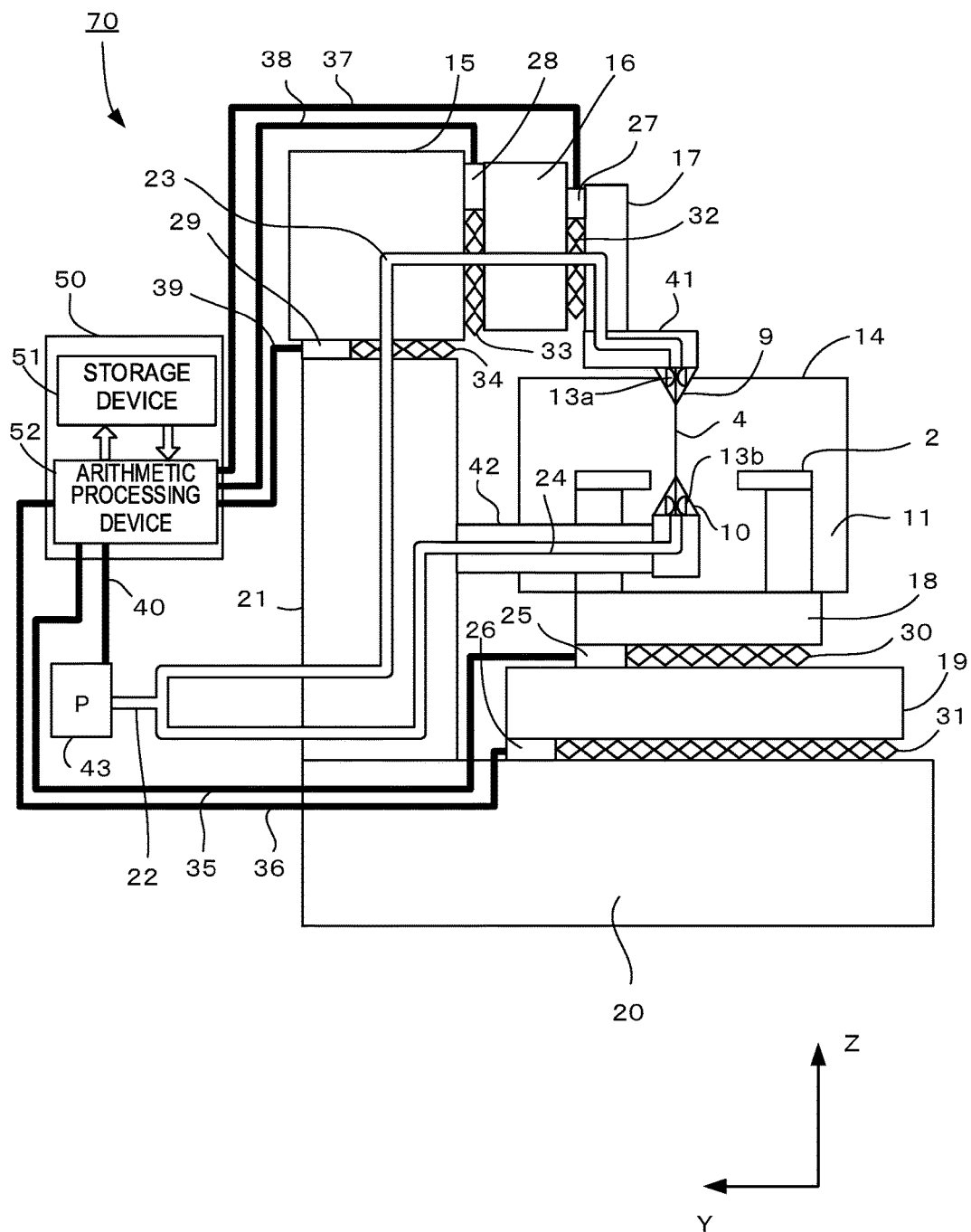
FIG. 1 is a schematic configuration diagram of a wire electric discharge machine.

FIG. 1 is a schematic configuration diagram of a wire electric discharge machine.

A wire electric discharge machine 70 generates electric discharge between a wire electrode 4 and workpiece 3, which is a workpiece, placed on a table 2 to perform machining of the workpiece 3. The wire electric discharge machine 70 includes, on a base 20, an X-axis saddle 19 that moves in an X-axis direction with a ball screw 31 driven by an X-axis motor 26. The wire electric discharge machine 70 includes, on the X-axis saddle 19, a Y-axis saddle 18 that moves in a Y-axis direction with a ball screw 30 driven by a Y-axis motor 25. A machining tank 14 including the table 2, on which the workpiece 3 is placed, on the inside is fixed on the Y-axis saddle 18.

A column 21 is provided perpendicularly to the base 20. A lower arm 42 is horizontally attached to a side surface section of the column 21. A lower nozzle 10 and a lower wire guide 13*b* are attached to the distal end of the lower arm 42. The lower nozzle 10 and the lower wire guide 13*b* are located below the table 2. The column 21 includes a V-axis saddle 15 in an upper part thereof. The V-axis saddle 15 moves in a V-axis direction with a ball screw 34 driven by a V-axis motor 29. The V-axis direction is the same as the Y-axis direction. A U-axis table 16 is attached to the V-axis saddle 15. The U-axis table 16 moves in a U-axis direction with a ball screw 33 driven by a U-axis motor 28. The U-axis direction is the same as the X-axis direction.

An upper-arm supporting member 17 is attached to the U-axis table 16. The upper-arm supporting member 17 moves in a Z-axis direction with a ball screw 32 driven by a Z-axis motor 27. An upper arm 41 is fixed to the upper-arm supporting member 17. An upper nozzle 9 and an upper wire guide 13*a* are attached to an end of the upper arm 41. The Y-axis motor 25, the X-axis motor 26, the Z-axis motor 27, the U-axis motor 28, and the V-axis motor 29 are respectively connected to a controller 50 by power/signal lines 35, 36, 37, 38, and 39. Electric power is supplied to the motors from the controller 50 including an amplifier (not-shown). Various signals are exchanged between the motors and the controller 50. Note that, in FIG. 1, the X axis and the U axis are directions perpendicular to the paper surface, the Y axis and the V axis are the left-right direction on the paper surface, and the Z axis is the up-down direction on the paper surface.

The machining tank 14 is attached on the Y-axis saddle 18. The table 2 is disposed in a tank of the machining tank 14. The workpiece 3 is fixed to the table 2. Electric discharge machining is executed in a state in which machining liquid 11 is stored in the machining tank 14. The upper nozzle 9 jets the machining liquid 11 to an upper part of the workpiece 3. The lower nozzle 10 jets the machining liquid 11 to a lower part of the workpiece 3. The upper wire guide 13a in the upper nozzle 9 supports the wire electrode 4 in the upper part of the workpiece 3. The lower wire guide 13b in the lower nozzle 10 supports the wire electrode 4 in the lower part of the workpiece 3.

The wire electric discharge machine 70 performs electric discharge between the wire electrode 4 and the workpiece 3 via the machining liquid 11. In order to perform stable electric discharge machining, in the wire electric discharge machine 70 a machining liquid pump 43 pumps up the machining liquid 11 from a storage tank (not shown) for storing the machining liquid 11 and jets the machining liquid 11 to a machined part at high pressure from the upper nozzle 9 and the lower nozzle 10 through a conduit 22, a conduit 23, and a conduit 24. The wire electric discharge machine 70 performs wire electric discharge machining while blowing off machining waste in a machining groove 12 with the jetted machining liquid 11.

The machining liquid pump 43 is connected to the controller 50 including the amplifier (not-shown) by a power/signal line 40 and is controlled and driven by the controller 50. Electric power is supplied from the controller 50 to the machining liquid pump 43. Exchange of signals is performed between the controller 50 and the machining liquid pump 43. The machining liquid pump 43 supplies the machining liquid 11 to the upper nozzle 9 via the branch conduit 22 and the conduit 23 and also supplies the machining liquid 11 to the lower nozzle 10 via the branch conduit 22 and the conduit 24. The machining liquid 11 is jetted to the machined part being discharge-machined from the upper nozzle 9 and the lower nozzle 10.

The controller 50 is a device that comprehensively controls the wire electric discharge machine 70. The controller 50 includes an arithmetic device, a display device, an interface for input and output of various signals, and an amplifier, all of which are not shown in the figure, and includes a storage device 51 that stores various data. In FIG. 1, the arithmetic device, the display device, the interface for input and output of various signals, and the amplifier are collectively shown as an arithmetic processing device 52.

Figure 2:
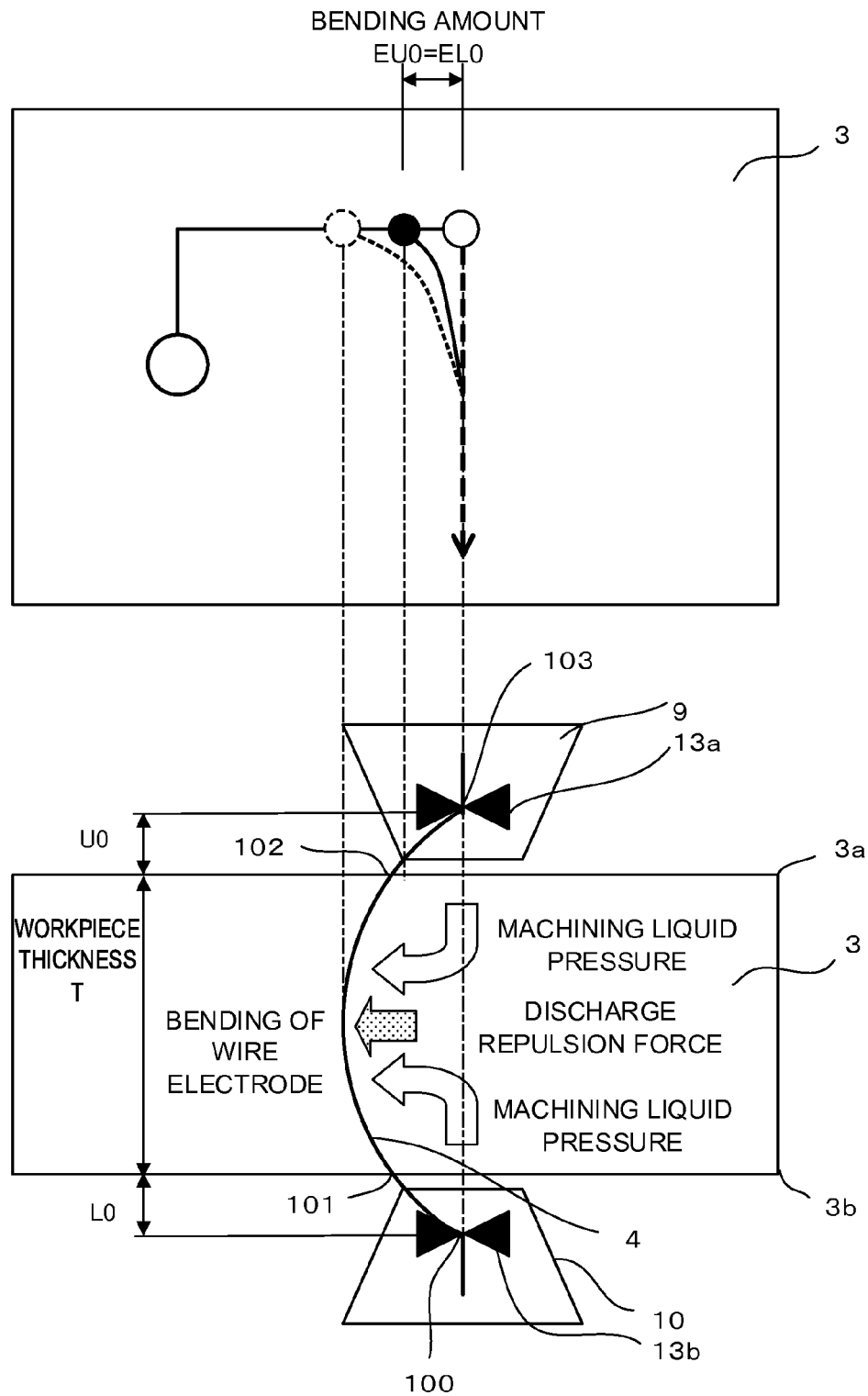
FIG. 2 is a diagram for explaining an example in which, when an upper nozzle section is closely attached to a workpiece upper surface and a lower nozzle section is closely attached to a workpiece lower surface, an error due to bending of a wire electrode is not corrected.

During the electric discharge machining, the wire electrode 4 bends in the direction opposite to a relative movement direction of the wire electrode 4 with respect to the workpiece 3 due to machining liquid pressure and a discharge repulsion force (see FIG. 2). It is seen from a machining test that deformation due to the bending of the wire electrode 4 is a shape same as vibration of a string. The shape is equal to displacement of a beam that receives uniformly distributed load with both ends supported. FIG. 7 is a diagram for explaining a displacement amount of the wire electrode 4 according to the position of the wire electrode 4. A bending amount x of the wire electrode 4 at any height z can be calculated by the following Expression (1).

$$x = F/2/T \times z \times (L-z) \quad (1)$$

In the expression, F represents a distributed load, T represents the tension of the wire electrode 4, and L represents the position in a z direction of the upper wire guide with respect to a lower wire guide position. Thus, displacement amount x=distributed load F/2/tension T×height z×(upper guide position L−height z).

A necessary route correction amount is calculated from the bending amount x calculated by the above Expression (1). That is, by substituting values in respective variables of Expression (1), respective displacement amounts (bending amounts x) of a workpiece upper surface and a workpiece lower surface are calculated. Positioning commands for the upper guide and the lower guide are corrected on the basis of the calculated displacement amounts. A discharge repulsion force generated by electric discharge, water pressure, and force due to a water flow act on the distributed load.

The wire electric discharge machine 70 has a function of performing correction of corner shapes independently on an upper surface 3a and a lower surface 3b of the workpiece 3. The wire electric discharge machine 70 calculates, on the upper and lower surfaces 3a and 3b of the workpiece 3, on the basis of the positions of the upper and lower wire guides 13a and 13b, the thickness of the workpiece 3, and the position of the workpiece 3, from a correction amount at the time when the nozzles (the upper nozzle 9 and the lower nozzle 10) of the upper and lower wire guides 13a and 13b are closely attached to the upper and lower surfaces of the workpiece 3, a shape correction amount in a so-called open state in which the upper nozzle 9 and the lower nozzle 10 and the upper surface 3a and the lower surface 3b of the workpiece 3 are spaced apart. The wire electric discharge machine 70 performs shape correction according to the calculated shape correction amount.

<1> Machining in a State in which the Distal End of the Nozzle and the Surface of the Workpiece are Closely Attached FIG. 2 is a diagram for explaining an example in which, when an upper nozzle section (the upper nozzle 9) is closely attached to the upper surface of the workpiece 3 and a lower nozzle section (the lower nozzle 10) is also closely attached to the lower surface of the workpiece 3, an error due to bending of the wire electrode 4 is not corrected. A state shown in FIG. 2 is a state in which the upper and lower nozzles 9 and 10 are respectively contiguous to the upper and lower surfaces 3a and 3b of the workpiece 3. "Closely attached" is not a state in which the distal end of the nozzle and the surface of the workpiece are in contact with each other, but "closely attached" means that the distal end of the nozzle and the surface of the workpiece are contiguous to each other with a space enough for executing wire electric discharge machining.

A relative position U0 in the workpiece thickness direction of the upper wire guide with respect to the upper surface 3a of the workpiece 3, a relative position L0 in the workpiece thickness direction of the lower wire guide with respect to the lower surface 3b of the workpiece 3, and a value of thickness T of the workpiece 3 at this point are stored in the storage device 51 of the controller 50 as one set of reference positions. A plurality of sets of reference positions are stored in the storage device 51 of the controller 50 by changing the workpiece thickness T.

FIG. 3 is a diagram showing a table for storing, by changing the workpiece thickness T, in the storage device 51, as a set of reference positions, the workpiece thickness T, the relative position U0 in the workpiece thickness direction of the upper wire guide with respect to the upper surface 3a of the workpiece 3, and the relative position L0 in the workpiece thickness direction of the lower wire guide with respect to the lower surface 3b of the workpiece 3. Instead of the thickness of the workpiece, the positions of the upper and lower wire guides and relative positions in the workpiece thickness direction of the upper and lower wire guides with respect to the workpiece upper and lower surfaces may be stored. In the reference positions, an upper surface reference correction amount CU0 and a lower surface reference correction amount CL0 are respectively stored by being measured.

In the reference positions of [the lower wire guide position L0, the workpiece thickness T, the upper wire guide position U0], the wire electrode 4 is formed in a shape passing position 100, a position 101, a position 102, and a position 103 shown in FIG. 2. On the upper surface 3a and the lower surface 3b of the workpiece 3, a machining route of the wire electrode 4 respectively shifts by bending amounts EU0 and EL0.

Figure 4:
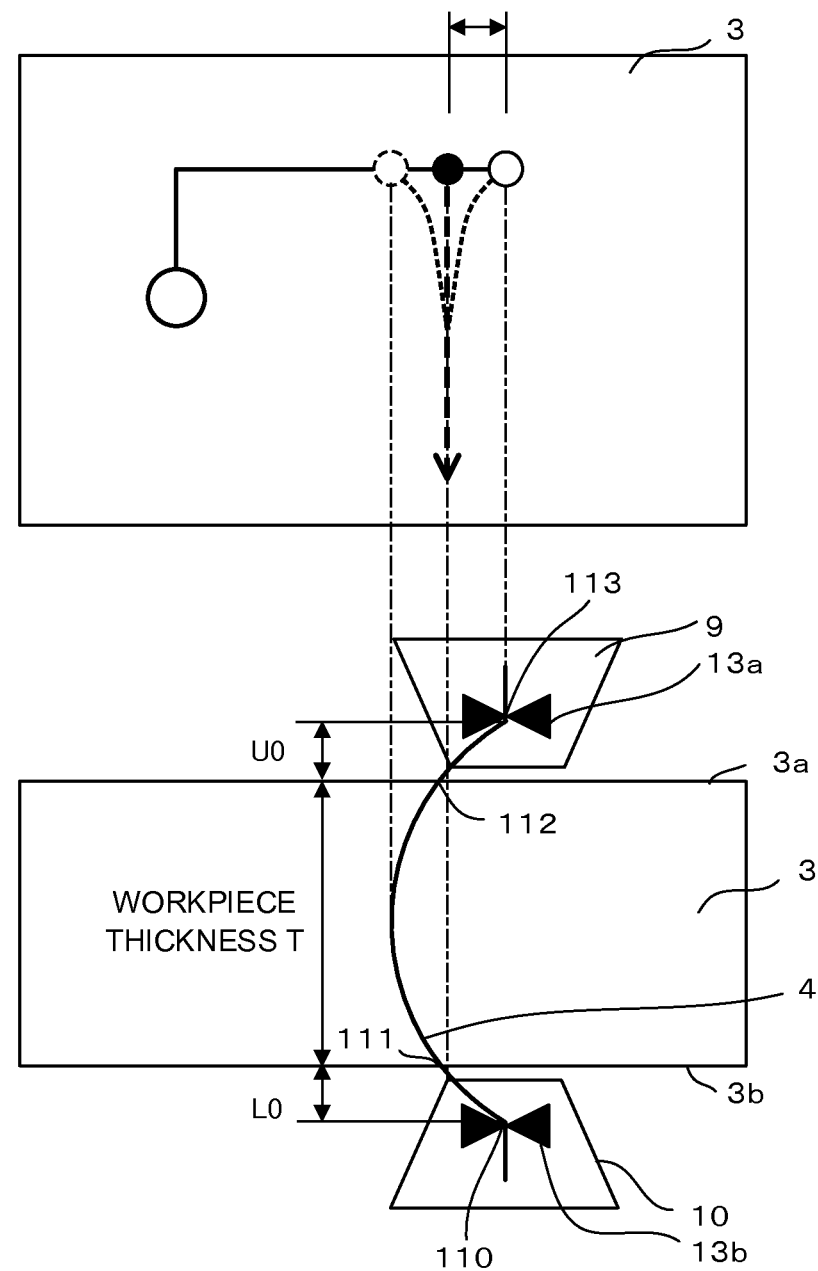
FIG. 4 is a diagram for explaining an example in which, when the upper nozzle section is closely attached to the workpiece upper surface and the lower nozzle section is closely attached to the workpiece lower surface, an error due to bending of the wire electrode is corrected.

Therefore, in order to eliminate a machining error (see FIG. 2) of the bending amounts EU0 and EL0, as shown in FIG. 4, a moving route on the machining route of the wire electrode 4 is changed by the upper surface reference correction amount CU0 on the upper surface 3a of the workpiece 3 and changed by the lower surface reference correction amount CL0 on the lower surface 3b. FIG. 4 is a diagram for explaining an example in which, when the upper nozzle section (the upper nozzle 9) is closely attached to the upper surface of the workpiece 3 and the lower nozzle section (the lower nozzle 10) is also closely attached to the lower surface of the workpiece 3, an error due to bending of the wire electrode 4 is corrected.

When the workpiece 3 is machined in a state in which upper and lower machining liquid jetting nozzles (the upper nozzle 9 and the lower nozzle 10) are closely attached to the upper and lower surfaces 3a and 3b of the workpiece 3 having the thickness T to be machined, the distances between the upper and lower wire guides 13a and 13b, which support the wire electrode 4 in upper and lower parts thereof, and the upper and lower surfaces 3a and 3b of the workpiece 3 are respectively represented as U0 and L0. A positional relation between the upper and lower wire guides 13a and 13b and the workpiece 3 in a state in which the upper and lower nozzles 9 and 10 are closely attached to the upper surface 3a and the lower surface 3b of the workpiece 3 is referred to as "reference position". The reference position is represented as (U0, L0). Shape error amounts (an upper shape error amount EU0 and a lower shape error amount EL0) due to bending of the wire electrode 4 are measured after the workpiece 3 is machined in the positional relation. Note that, as shown in FIG. 2, the upper and lower shape error amounts EU0 and EL0 can be regarded as bending amounts of the wire electrode 4 in the reference position.

Correction amounts for correcting the machining route in order to correct the upper and lower shape error amounts EU0 and EL0 are represented as upper and lower surface reference amounts CU0 and CL0 as shown in FIG. 4. As shown in FIG. 4, the upper surface reference correction amount CU0 and the lower surface reference correction amount CL0 are calculated from a bending amount attributable to a relation between the upper and lower wire guides 13a and 13b in the closely attached state to the upper and lower surfaces of the workpiece 3 and the position of the wire electrode 4. In this case, the upper surface reference correction amount CU0 and the lower surface reference correction amount CL0 are substantially equal values. When a shape error is corrected, the shape error only has to be corrected according to relative movement in a plane direction of the table 2, on which the workpiece 3 is fixed, and the upper and lower guide sections (the upper wire guide 13a and the lower wire guide 13b) which stretch the wire electrode 4 in the up-down direction. In the configuration of the wire electric discharge machine 70 shown in FIG. 1, the positions of the X axis and the Y axis of the table for relatively moving the workpiece with respect to the upper and lower guide sections only have to be corrected.

Figure 5:
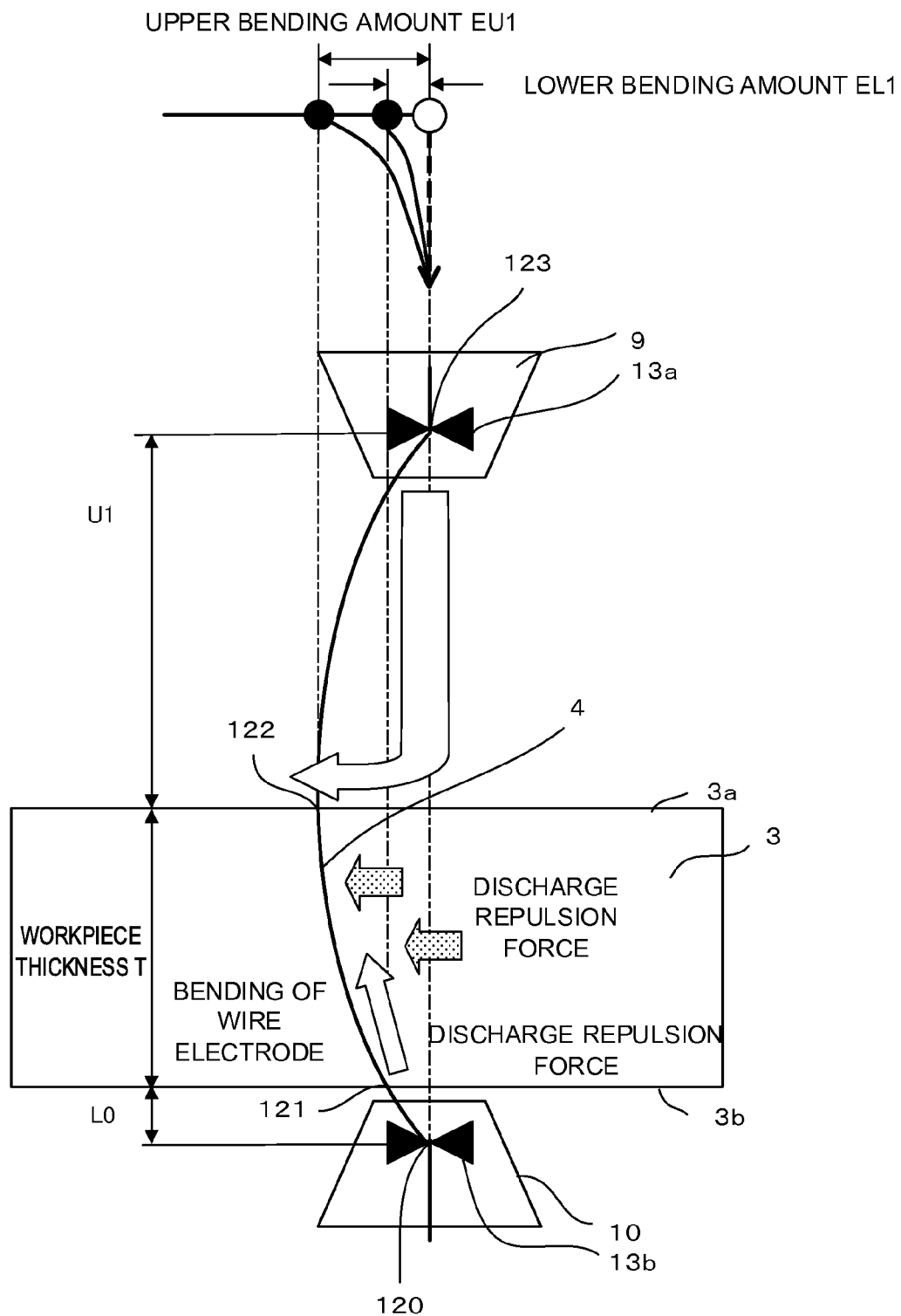
FIG. 5 is a diagram for explaining an example in which, when the upper nozzle section is separated from the workpiece upper surface and the lower nozzle section is closely attached to the workpiece lower surface, an error due to bending of the wire electrode is not corrected.
Figure 6:
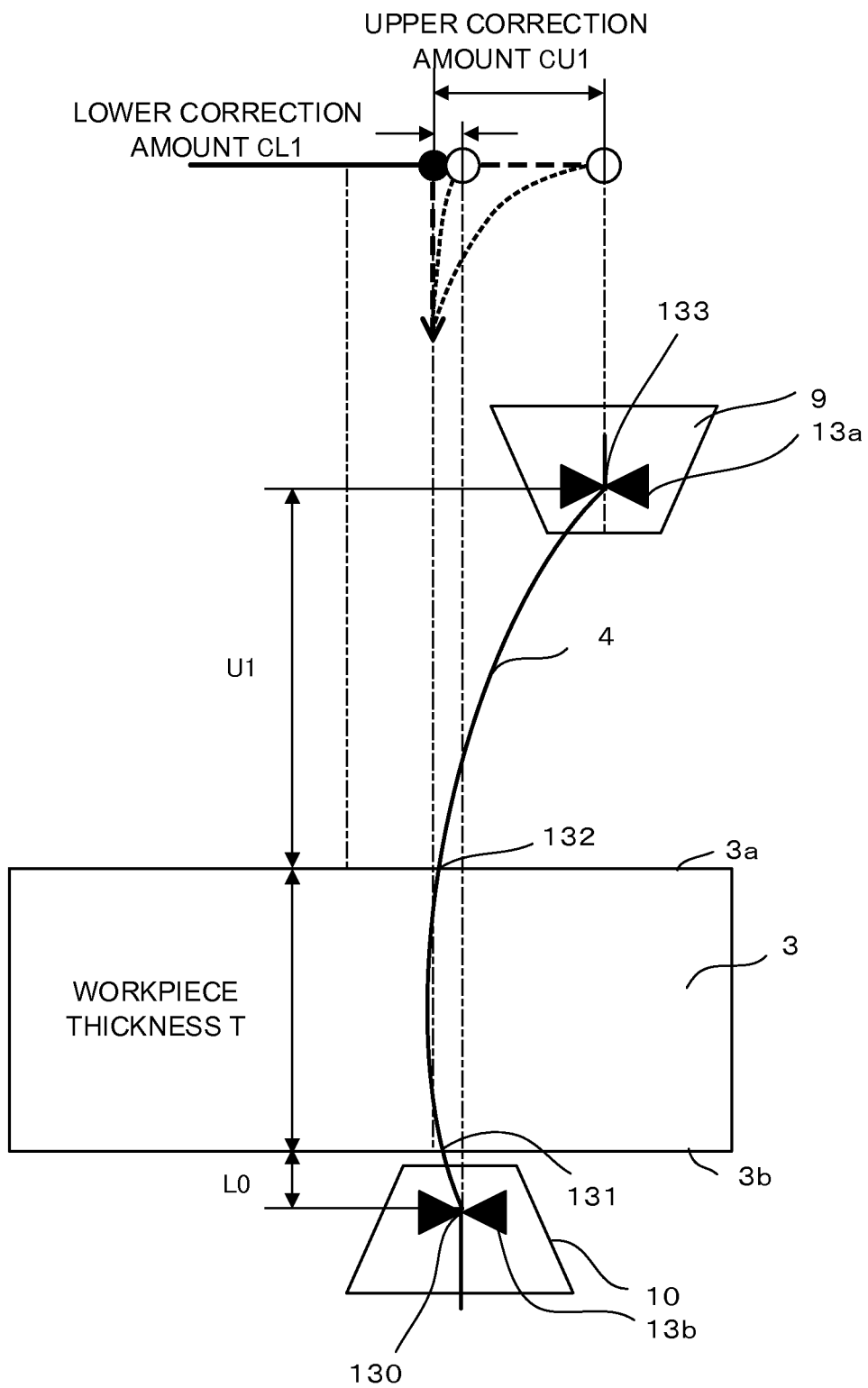
FIG. 6 is a diagram for explaining an example in which, when the upper nozzle section is separated from the workpiece upper surface and the lower nozzle section is closely attached to the workpiece lower surface, an error due to bending of the wire electrode is corrected.

<2> Machining in a State in which the Distal End of the Upper Nozzle and the Upper Surface of the Workpiece are Apart from Each Other FIG. 5 is a diagram for explaining an example in which, when the upper nozzle section is separated from the upper surface 3a of the workpiece 3 and the lower nozzle section is closely attached to the lower surface 3b of the workpiece 3, an error due to bending of the wire electrode 4 is not corrected. FIG. 6 is a diagram for explaining an example in which, when the upper nozzle section is separated from the upper surface 3a of the workpiece 3 and the lower nozzle section is closely attached to the lower surface 3b of the workpiece 3, an error due to bending of the wire electrode 4 is corrected.

When the upper and lower nozzle sections (the upper nozzle 9 and the lower nozzle 10) cannot be closely attached to the upper and lower surfaces 3a and 3b of the workpiece 3 to be machined, a distance U1 between the upper wire guide 13a and the upper surface 3a of the workpiece 3 and a distance L1 between the lower wire guide 13b and the lower surface 3b of the workpiece 3 are calculated from position information of the upper and lower surfaces 3a and 3b of the workpiece 3 and position information of the upper and lower wire guides 13a and 13b that support the wire electrode 4.

Bending amounts of the wire electrode 4 corresponding to the calculated distances are calculated on the basis of the shape error amounts (EU0, EL0) due to a bending amount in the reference position or the reference correction amounts (CU0, CL0), which are correction amounts in the reference position. The calculated bending amounts or correction amounts of the wire electrode 4 are set as the bending amounts (the upper bending amount EU1 and the lower bending amount EL1) or the correction amounts (the upper surface correction amount CU1 and the lower surface correction amount CL1). An error due to bending of the wire electrode 4 is corrected with the bending amounts (EU1, EL1) or the correction amounts (CU1, CL1) respectively on the upper and lower surfaces 3a and 3b of the workpiece 3.

In the case of FIG. 6, correction amounts on the upper and lower surfaces 3a and 3b of the workpiece 3 are calculated from a relation between the upper and lower wire guides 13a and 13b and the thickness T of the workpiece 3 and a relation of the reference correction amounts (EU0, EL0). The above Expression (1) is modified such that deformation due to bending of the wire electrode 4 passes a position 130, a position 131, and a position 132 in FIG. 6. The upper surface correction amount CU1 in the upper wire guide position U1 is calculated using the modified Expression (1). UV axes correction movement amounts adjusted by correction movement amounts by the X and Y axes on the lower surface and correction movement amounts by the X and Y axes on the upper surface are controlled to minimize shape errors on the upper and lower surfaces of the workpiece 3.

For example, when the thickness of the workpiece 3 is 50 mm, the lower surface 3b of the workpiece 3 and a lower guide section (the lower nozzle 10) are closely attached, and the upper surface 3a of the workpiece 3 and an upper guide section (the upper nozzle 9) are separated by 50 mm, by calculating a positional shift amount at points where a shape line of displacement of the wire electrode 4 and the upper and lower surfaces 3a and 3b of the workpiece 3 overlap each other, it is possible to calculate the upper bending amount EU1 and the lower bending amount EL1, which are bending amounts, or the upper surface correction amount CU1 and the lower surface correction amount CL1, which are correction amounts.

Figure 8:
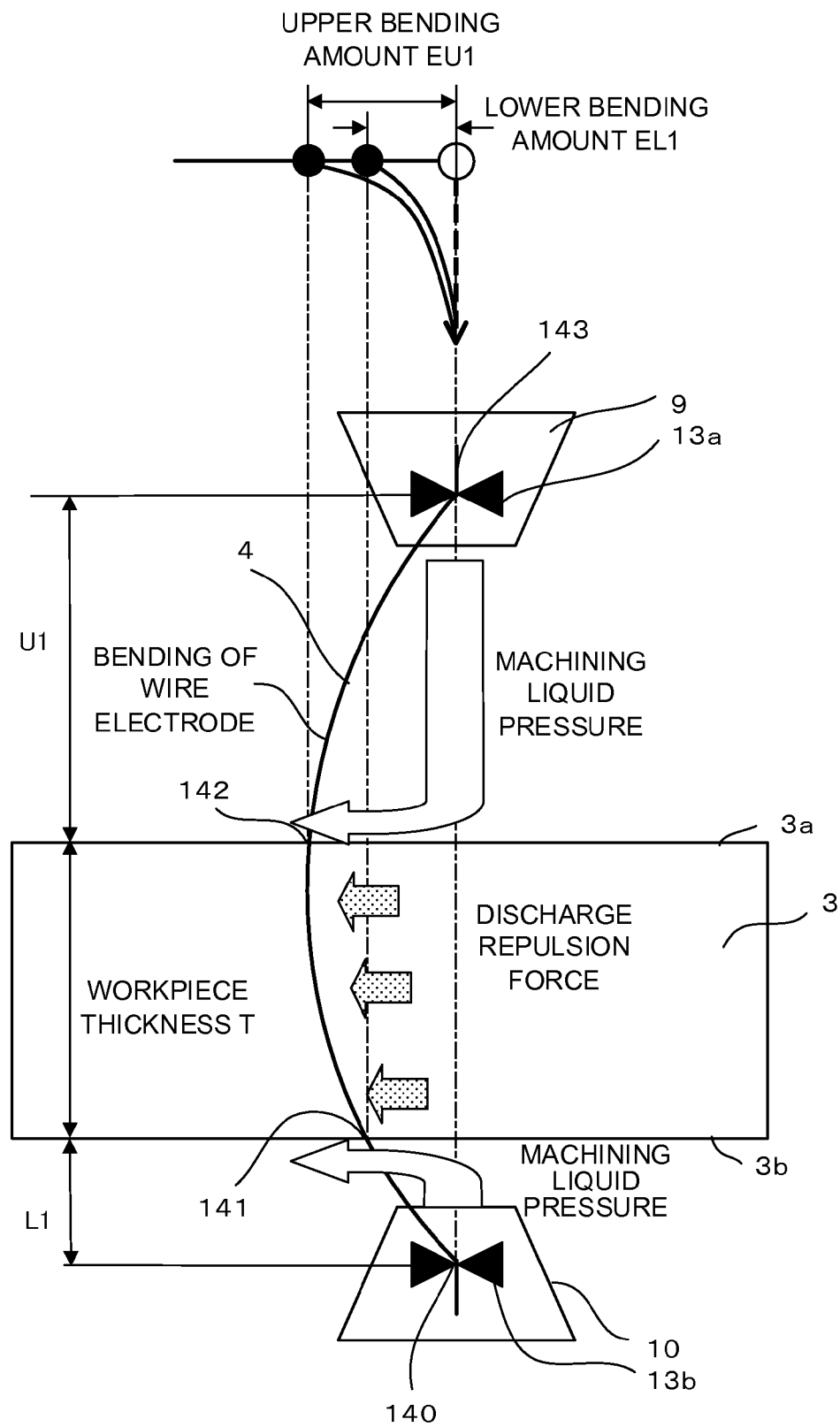
FIG. 8 is a diagram for explaining an example in which, when the upper nozzle section is separated from the workpiece upper surface and the lower nozzle section is separated from the workpiece lower surface, an error due to bending of the wire electrode is not corrected.
Figure 9:
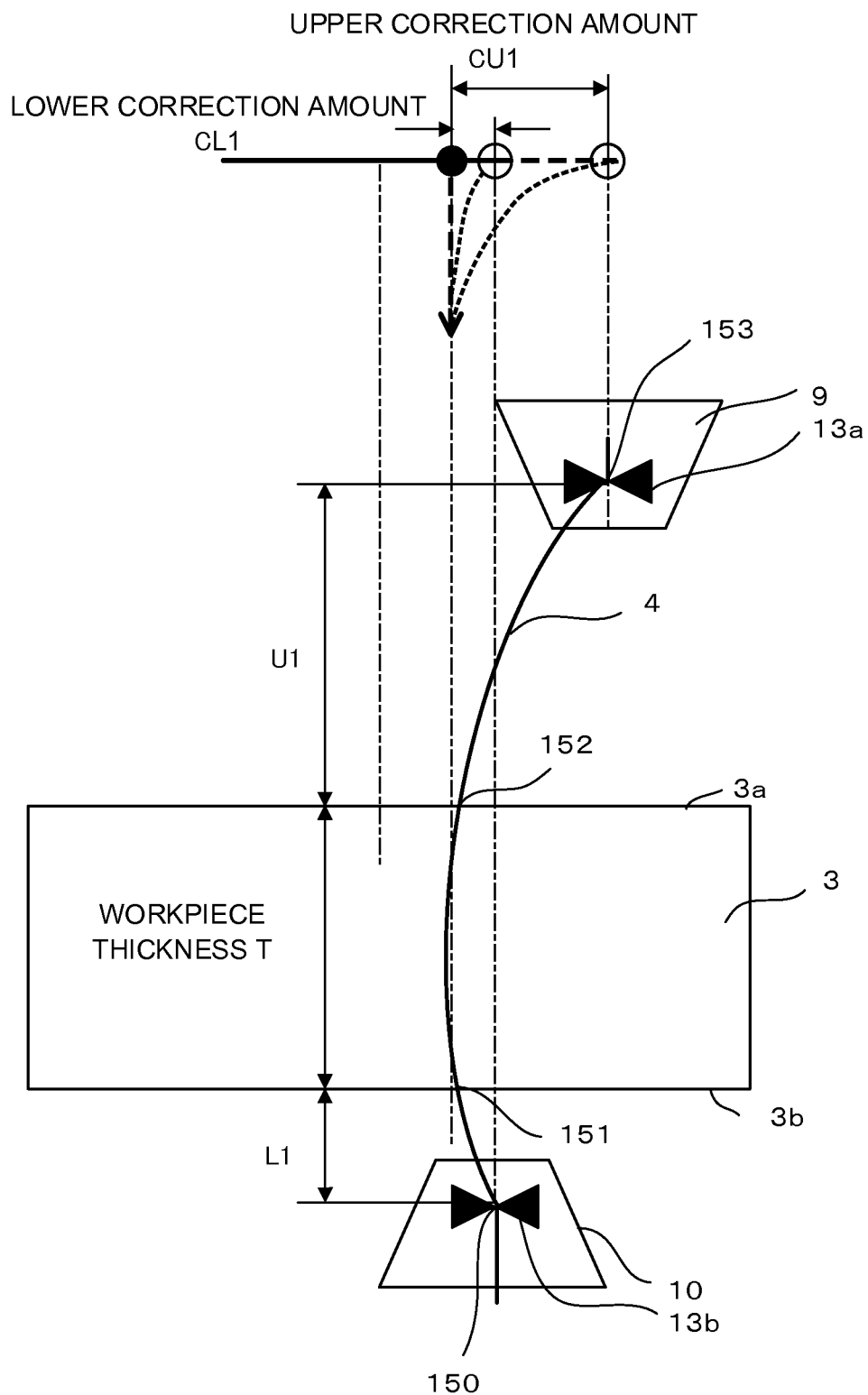
FIG. 9 is a diagram for explaining an example in which, when the upper nozzle section is separated from the workpiece upper surface and the lower nozzle section is separated from the workpiece lower surface, an error due to bending of the wire electrode is corrected.

<3> Machining in a State in which the Distal End of the Upper Nozzle and the Workpiece Upper Surface are Separated and the Distal End of the Lower Nozzle and the Lower Surface of the Workpiece are Separated FIG. 8 is a diagram for explaining an example in which, when the upper nozzle section (the upper nozzle 9) is separated from the upper surface 3a of the workpiece 3 and the lower nozzle section (the lower nozzle 10) is also separated from the lower surface 3b of the workpiece 3, an error due to bending of the wire electrode 4 is not corrected. FIG. 9 is a diagram for explaining an example in which, when the upper nozzle section (the upper nozzle 9) is separated from the upper surface 3a of the workpiece 3 and the lower nozzle section (the lower nozzle 10) is also separated from the lower surface 3b of the workpiece 3, an error due to bending of the wire electrode 4 is corrected. As in <2> above, the modified Expression (1) of the wire electrode 4 that passes a position 150, a position 151, and a position 152 shown in FIG. 9 is calculated. The upper surface correction amount CU1 in the upper wire guide position U1 at this point is calculated.

When the upper and lower nozzle sections (the upper nozzle 9 and the lower nozzle 10) cannot be closely attached to the upper and lower surfaces 3a and 3b of the workpiece 3 to be machined, the distance U1 between the upper wire guide 13a and the upper surface 3a of the workpiece 3 and the distance L1 between the lower wire guide 13b and the lower surface 3b of the workpiece 3 are calculated from the position information of the upper and lower surfaces 3a and 3b of the workpiece 3 and the position information of the upper and lower wire guides 13a and 13b that support the wire electrode 4.

Bending amounts of the wire electrode 4 corresponding to the calculated distances U1 and L1 are calculated on the basis of the bending amounts (the upper shape error amounts EU0 and the lower shape error amounts EL0) in the reference position or the reference correction amounts (the upper surface reference correction amounts CU0 and the lower surface reference correction amount CL0), which are the correction amounts in the reference position. The calculated bending amounts or correction amounts of the wire electrode 4 are set as the bending amounts (EU1, EL1) or the correction amounts (CU1, CL1). An error due to bending of the wire electrode 4 is corrected with the bending amounts (EU1, EL1) or the correction amounts (CU1, CL1) respectively on the upper and lower surfaces 3a and 3b of the workpiece 3.

Figure 12:
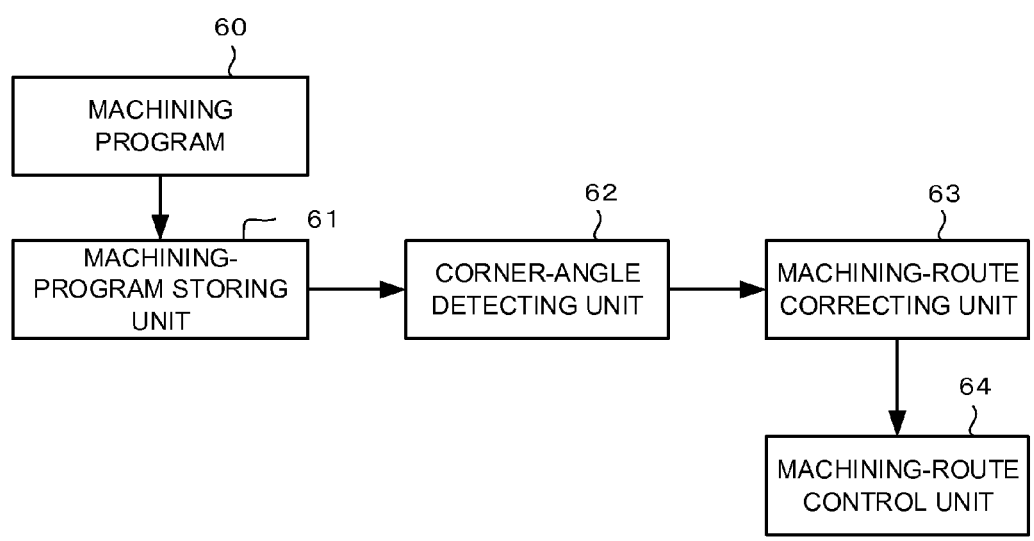
FIG. 12 is a block diagram of a main part of the wire electric discharge machine.

FIG. 12 is a block diagram of a main part of the wire electric discharge machine.

The wire electric discharge machine 70 according to the present invention can automatically correct a machining route according to an angle formed by moving blocks that form a corner section. The wire electric discharge machine 70 reads a block of a machining program from a machining-program storing unit 61 in which a machining program 60 is stored, analyzes the read block, and determines, with a corner-angle detecting unit 62, whether a corner is present or not. When a corner is present, the wire electric discharge machine 70 creates, in a machining-route correcting unit 63, a correction route according to the angle and causes a machining-route control unit 64 to move the wire electrode 4 relatively to the workpiece 3. When a corner is absent, the wire electric discharge machine 70 does not create a correction route and causes the machining-route control unit 64 to move the wire electrode 4 relatively to the workpiece 3.

The machining-route correcting unit 63 calculates a correction distance (the correction amount explained above) and a return distance on the basis of the corner angle detected by the corner-angle detecting unit 62, extends, according to the correction distance, an end point of a block to be machined first, deletes, according to the return distance, a block to be machined next from a start point to halfway in the block, corrects the machining route to connect a new block end point created by the extension and a new block start point created by the deletion, and outputs the corrected machining route to the machining-route control unit 64 (specifically, see Japanese Patent Application Laid-Open No. 2014-121755).

FIG. 13 is a flowchart showing processing in performing correction independently in the upper and lower wire guides according to the distance between the upper and lower guides according to the present invention. The processing is explained below according to steps.

[Step SB01] The thickness T of the workpiece 3, the relative position U0 in the workpiece thickness direction of the upper wire guide with respect to the upper surface 3a of the workpiece 3, and the relative position L0 in the thickness direction of the lower wire guide with respect to the lower surface 3b of the workpiece 3 in a state in which the upper nozzle and the lower nozzle are closely attached to the surface of the workpiece are stored.

[Step SB02] The upper bending amount EU1 on the workpiece upper surface 3a and the lower bending amount EL1 on the workpiece lower surface 3b of the wire electrode 4 are calculated from the information stored in step SB01, the actual distance U1 between the upper wire guide 13a and the upper surface 3a of the workpiece 3, the actual distance L1 between the lower wire guide 13b and the lower surface 3b of the workpiece 3, and the thickness T of the workpiece 3.

[Step SB03] The correction amount (the upper surface correction amount) CU1 of the upper guide position and the correction amount (the lower surface correction amount) CL1 of the lower guide position are calculated from the upper bending amount EU1 and the lower bending amount EL1 calculated in step SB02.

[Step SB04] A correction route of the upper wire guide position and the lower wire guide position is calculated from the upper surface correction amount CU1 and the lower surface correction amount CL1 calculated in step SB03.

[Step SB05] The correction route calculated in step SB04 is output. The processing is ended.

In the example explained above, the upper surface correction amount CU1 and the lower surface correction amount CL1 of the upper and lower wire guides 13a and 13b are calculated on the basis of the above Expression (1). Instead of using the expression, machining route errors in combinations of many workpiece thicknesses and upper and lower guide positions may be measured by a machining test and stored as indicated in, for example, a table in FIG. 10 or a graph in FIG. 11 as the respective correction amounts.

FIG. 14 is a diagram for explaining that a plurality of sets of relative positions (U1, L1) of the upper and lower wire guides in the workpiece thickness direction with respect to the workpiece upper and lower surfaces and the thickness T of the workpiece are stored as reference positions and that correction amounts (the upper surface correction amount CU1 and the lower surface correction amount CL1) for correcting shift amounts between wire guide coordinate positions on a machining program route in the reference positions and actual machining positions on the workpiece upper and lower surfaces due to wire bending during machining are stored.

A table shown in FIG. 14 is stored in the storage device 51 of the controller 50. The upper surface correction amount CU1 and the lower surface correction amount CL1 for correcting shift amounts when the thickness T of the workpiece is 5, 10, 20, and 30 (mm), the upper wire guide position (the upper surface distance) U1 is 5, 10, 20, and 30 (mm), and the lower wire guide position (the lower surface distance) L1 is 5, 10, 20, and 30 (mm) are stored. Note that, in FIG. 14, "CU1" and "CL1" are described in all columns. However, actually, specific values corresponding to the upper surface distance U1 and the lower surface distance L1 are stored.

Figure 11:
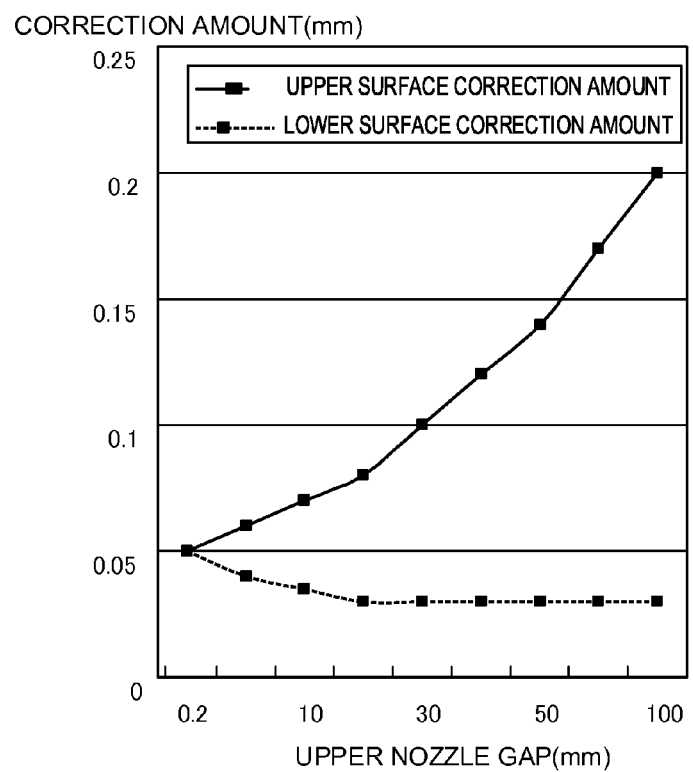
FIG. 11 is a diagram showing FIG. 10 as a graph.

FIG. 10 is a diagram showing, as an example of FIG. 14, correction amounts for correcting shift amounts when the upper nozzle section is separated from the upper surface 3a of the workpiece 3 and the lower nozzle section is closely attached to the lower surface 3b of the workpiece 3. FIG. 11 is a diagram showing FIG. 10 as a graph. An "upper nozzle gap" corresponds to a value obtained by subtracting the distance between the distal end portion of the upper nozzle and the wire guide from the upper wire guide position U1. An "upper surface correction amount" corresponds to the upper surface correction amount CU1. A "lower surface correction amount" corresponds to the lower surface correction amount CL1.

An example of a controller that controls a wire electric discharge machine main body configuring the wire electric discharge machine according to the present invention is explained with reference to a block diagram. Note that blocks having similar functions are denoted by the same reference numerals.

First, a first example of the controller that controls the wire electric discharge machine main body is explained with reference to a block diagram of FIG. 15.

The controller 50 includes a reference-position storing unit 81 that stores, as reference positions, relative positions in the workpiece thickness direction of the upper and lower wire guides with respect to the workpiece upper and lower surfaces and workpiece thickness in a state in which the upper and lower wire guides are contiguous to the machining workpiece upper and lower surfaces, a correction-amount storing unit 82 that stores correction amounts for correcting shift amounts between wire guide coordinate positions on a machining program route in the reference positions and actual machining positions on the workpiece upper and lower surfaces due to wire bending during machining, a setting unit 80 that sets relative positions in the workpiece thickness direction of the upper and lower wire guides with respect to the workpiece upper and lower surfaces in any upper and lower wire guide positions and workpiece thickness, a correction-amount calculating unit 83 that calculates, on the basis of the stored reference positions and the correction amounts, correction amounts for correcting the respective shift amounts in the set relative positions of the upper and lower wire guides in the workpiece thickness direction of the upper and lower wire guides with respect to the workpiece upper and lower surfaces and the set workpiece thickness, and a wire-guide-position correcting unit 84 that corrects, on the basis of the calculated correction amounts, the positions of the upper and lower wire guides in a relative movement command of the wire guide with respect to the workpiece commanded by the machining program, independently in the upper guide section and the lower guide section.

Note that, instead of the correction-amount storing unit 82, the controller 50 may include a shift-amount storing unit that stores shift amounts between wire guide coordinate positions on the machining program route in the reference positions and actual machining positions on the workpiece upper and lower surfaces due to wire bending during machining and a correction-amount calculating unit that calculates correction amounts from the shift amounts stored in the shift-amount storing unit.

A second example of the controller that controls the wire electric discharge machine main body is explained with reference to a block diagram of FIG. 16.

The controller 50 includes the reference-position storing unit 81 that stores a plurality of sets of relative positions in the workpiece thickness direction of the upper and lower wire guides with respect to the workpiece upper and lower surfaces and workpiece thickness, the correction-amount storing unit 82 that stores correction amounts for correcting shift amounts between wire guide coordinate positions on a machining program route in the plurality of reference positions and actual machining positions on the workpiece upper and lower surfaces due to wire bending during machining, the setting unit 80 that sets relative positions in the workpiece thickness direction of the upper and lower wire guides with respect to the workpiece upper and lower surfaces in any upper and lower wire guide positions and workpiece thickness, a selecting unit 85 that selects, from the sets of the relative positions in the workpiece thickness direction of the upper and lower wire guides with respect to the workpiece upper and lower surfaces and the workpiece thickness stored by the reference-position storing unit 81, a plurality of sets close to the set relative positions in the workpiece thickness direction of the upper and lower wire guides with respect to the workpiece upper and lower surfaces and the set thickness of the workpiece, the correction-amount calculating unit 83 that calculates, on the basis of the plurality of reference positions of the selected plurality of sets and the correction amounts stored by the correction-amount storing unit, correction amounts for correcting the respective shift amounts in the set relative positions in the workpiece thickness direction of the upper and lower wire guides with respect to the workpiece upper and lower surfaces and the set workpiece thickness, and the wire-guide-position correcting unit 84 that corrects, on the basis of the calculated correction amounts, the positions of the upper and lower wire guides in a relative movement command of the wire guide with respect to the workpiece commanded by the machining program, independently in the upper guide section and the lower guide section.

When the selecting unit 85 cannot specify one set of corresponding reference positions in the table shown in FIG. 14, for example, when the upper surface distance U1 is 15 mm, a set of two reference positions is selected. The correction-amount calculating unit 83 calculates correction amounts by interpolating the upper surface correction amounts CU1 and the lower surface correction amounts CL1 respectively stored in association with the selected sets of the two reference positions.

Note that, instead of the correction-amount storing unit 82, the controller 50 may include a shift-amount storing unit that stores shift amounts between wire guide coordinate positions on the machining program route in the plurality of reference positions and actual machining positions on the workpiece upper and lower surfaces due to wire bending during machining and a correction-amount calculating unit that calculates correction amounts from the shift amounts stored in the shift-amount storing unit.

A third example of the controller that controls the wire electric discharge machine main body is explained with reference to a block diagram of FIG. 17.

The controller 50 includes the reference-position storing unit 81 that stores a plurality of sets of relative positions in workpiece thickness direction of upper and lower wire guides with respect to workpiece upper and lower surfaces and workpiece thickness, the correction-amount storing unit 82 that stores correction amounts for correcting shift amounts between wire guide coordinate positions on a machining program route in the plurality of reference positions and actual machining positions on the workpiece upper and lower surfaces due to wire bending during machining, the setting unit 80 that sets relative positions in the workpiece thickness direction of the upper and lower wire guides with respect to the workpiece upper and lower surfaces in any upper and lower wire guide positions and workpiece thickness, a correction-amount invoking unit 86 that invokes, from the stored plurality of reference positions and the correction amounts stored by the correction-amount storing unit 82, correction amounts for correcting the respective shift amounts in the set relative positions in the workpiece thickness direction of the upper and lower wire guides with respect to the workpiece upper and lower surfaces and the set workpiece thickness, and the wire-guide-position correcting unit 84 that corrects, on the basis of the invoked calculated correction amounts, the positions of the upper and lower wire guides in a relative movement command of the wire guide with respect to the workpiece commanded by the machining program, independently in an upper guide section and a lower guide section. When the upper surface distance U1 and the lower surface distance L1 corresponding to the relative positions of the upper and lower surfaces and the thickness T of the workpiece set by the setting unit 80 are not stored, the correction-amount invoking unit 86 invokes the upper surface correction amounts CU1 and the lower surface correction amounts CL1 of sets close to the set of the reference positions set by the setting unit 80.

Note that, instead of the correction-amount storing unit 82, the controller 50 may include a shift-amount storing unit that stores shift amounts between wire guide coordinate positions on the machining program route in the plurality of reference positions and actual machining positions on the workpiece upper and lower surfaces due to wire bending during machining and a correction-amount calculating unit that calculates correction amounts from the shift amounts stored in the shift-amount storing unit.

Figure 15:
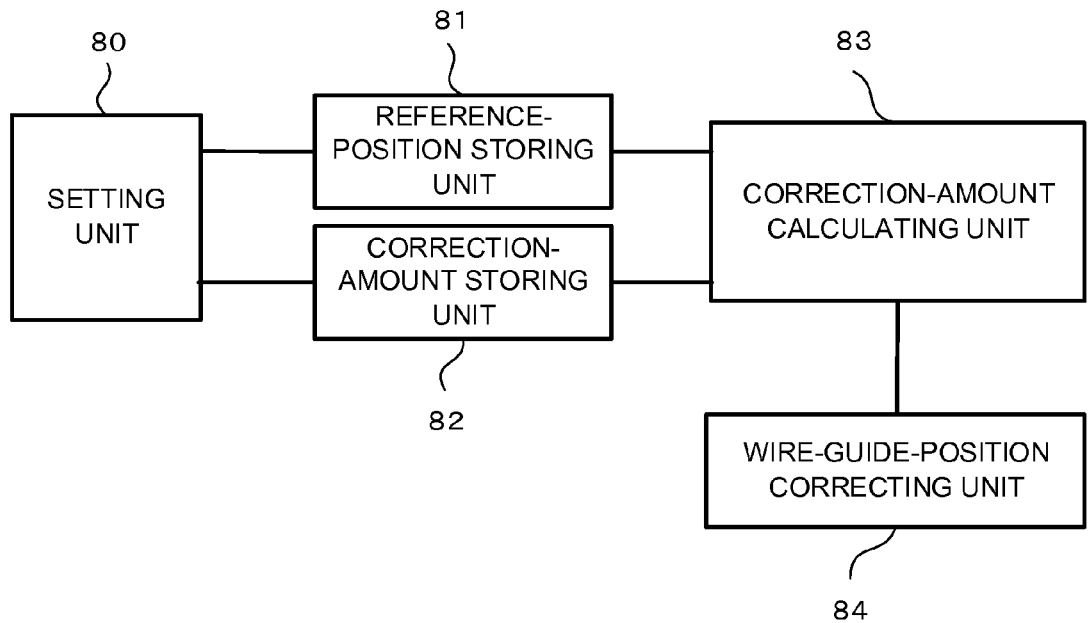
FIG. 15 is a block diagram for explaining a first example of a controller that controls a main body of the wire electric discharge machine according to the present invention.
Figure 16:
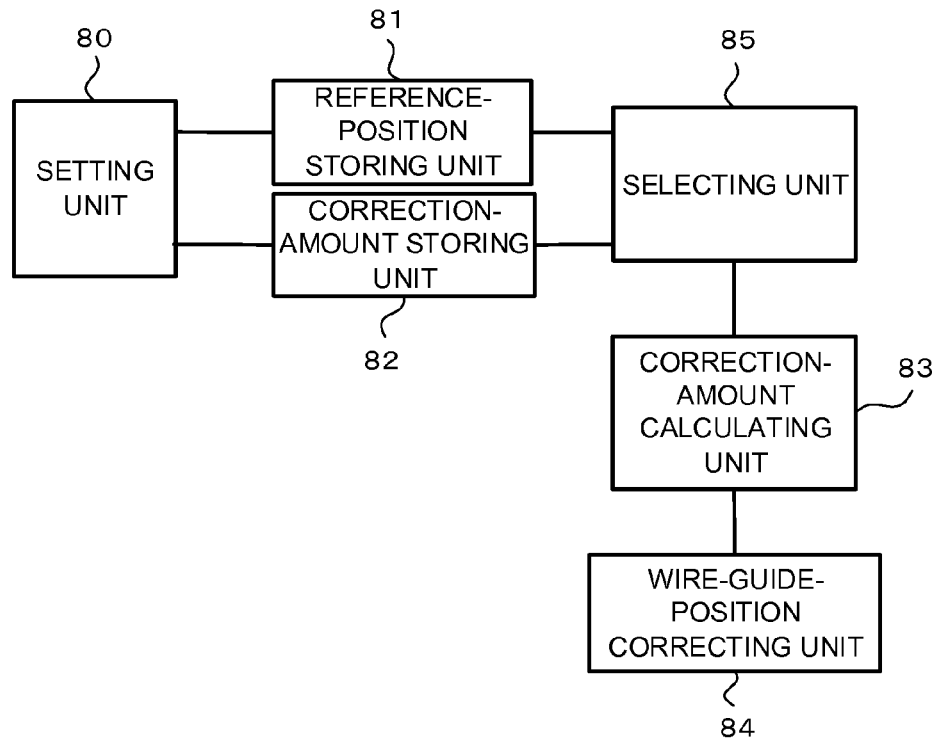
FIG. 16 is a block diagram for explaining a second example of the controller that controls the main body of the wire electric discharge machine according to the present invention.
Figure 17:
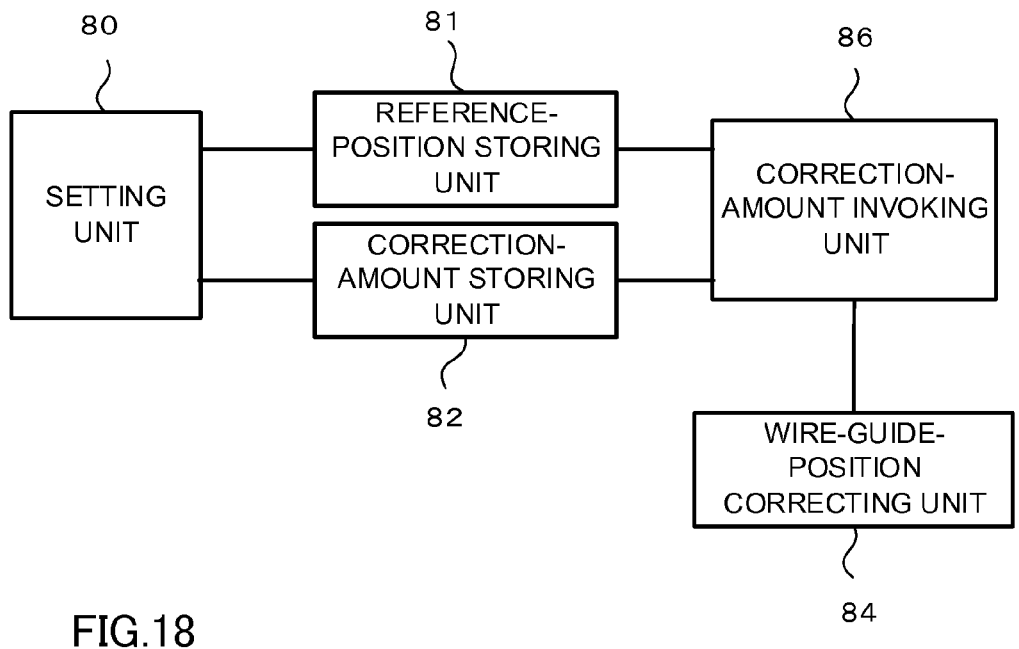
FIG. 17 is a block diagram for explaining a third example of the controller that controls the main body of the wire electric discharge machine according to the present invention.
Figure 18:
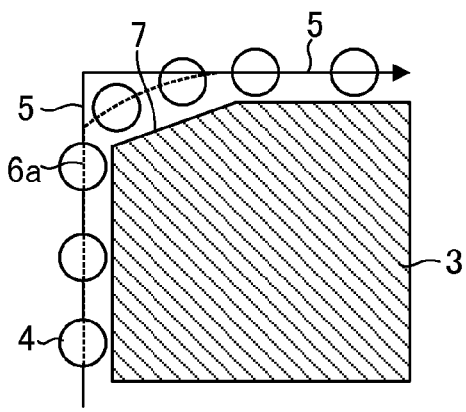
FIG. 18 is a diagram for explaining machining of a corner section.
Figure 19:
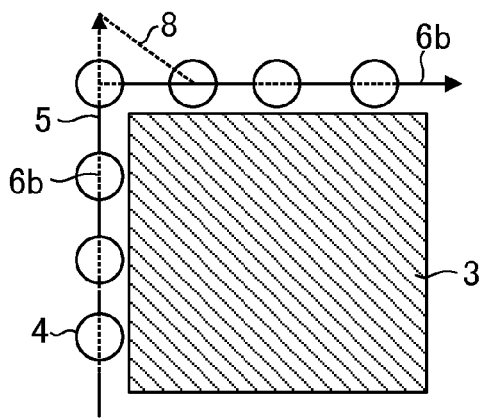
FIG. 19 is a diagram for explaining a method of correcting a machining route in order to prevent workpiece from being excessively machined because of bending of a wire electrode.

The controller shown in the block diagrams of FIGS. 15, 16, and 17 may store a plurality of sets of the positions of the upper and lower wire guides and relative positions in the workpiece thickness direction of the upper and lower wire guides with respect to the workpiece upper and lower surfaces, instead of storing the plurality of sets of relative positions in the workpiece thickness direction of the upper and lower wire guides with respect to the workpiece upper and lower surfaces and workpiece thickness.

According to the present invention, even when one of the upper nozzle section and the lower nozzle section is separated from the upper surface 3*a* or the lower surface 3*b* of the workpiece 3 and the other is closely attached to the upper surface 3*a* or the lower surface 3*b* of the workpiece 3 or when both of the upper nozzle section and the lower nozzle section are separated from the upper surface 3*a* and the lower surface 3*b* of the workpiece 3, it is possible to minimize a machining shape error on the upper and lower surfaces of the workpiece. A machining time increase due to a machining speed decrease caused by an energy reduction for reducing bending in a corner section in the past does not occur. It is possible to obtain a highly efficient and highly accurate machining result.

What is claimed is:

1. A wire electric discharge machine, comprising:
 a machining tank;
 a table configured to support a workpiece and disposed in the machining tank;
 an upper wire guide including an upper nozzle;
 a lower wire guide including a lower nozzle;
 a wire electrode stretched between the upper and lower wire guides;
 a first group of motors configured to move the upper and lower wire guides;
 a second group of motors configured to move the table;
 a pump configured to jet machining liquid via the upper and lower nozzles to the workpiece on the table in the machining tank; and
 a controller connected to the first and second groups of motors and the pump by power and signal lines to obtain positions of the upper and lower wire guides and a position of the table,
 wherein the controller includes
 a processor configured to,
  control the first group of motors to move the upper and lower wire guides to cause the wire electrode to be moved with respect to the workpiece, or control the second group of motors to move the table to cause the workpiece to be moved with respect to the wire electrode, on the basis of a machining program in order to perform electric discharge machining of the workpiece by the wire electrode in the machining tank, wherein a shift is caused by wire bending of the wire electrode in a direction opposite to a movement direction of the wire electrode with respect to the workpiece due to machining liquid pressure and a discharge repulsive force generated during the electric discharge machining; and
 a memory configured to
  store, as a reference position, (i) positions of the upper and lower wire guides in a workpiece thickness direction with respect to workpiece upper and lower surfaces of the workpiece and (ii) a thickness of the workpiece, in a state in which the upper and lower wire guides respectively approach the workpiece upper and lower surfaces, and
  store correction amounts for correcting shift amounts between (a) wire guide coordinate positions on a machining program route in the reference position and (b) actual machining positions on the workpiece upper and lower surfaces,
 wherein
 the processor is configured to
  set values corresponding to positions of the upper and lower wire guides in the workpiece thickness direction with respect to the workpiece upper and lower surfaces, and a value corresponding to the thickness of the workpiece,
  calculate correction amounts, on the basis of the stored reference position and the stored correction amounts, for correcting the respective shift amounts in the set values corresponding to the positions in the workpiece thickness direction with respect to the workpiece upper and lower surfaces and the set value corresponding to the thickness of the workpiece, correct positions of the upper and lower wire guides independently of each other, on the basis of the calculated correction amounts, and cause the wire electrode to move with respect to the workpiece according to the corrected positions of the upper and lower wire guides in a movement command of the upper and lower wire guides with respect to the table commanded by the machining program.

2. A wire electric discharge machine, comprising:

a machining tank;

a table configured to support a workpiece and disposed in the machining tank;

an upper wire guide including an upper nozzle;

a lower wire guide including a lower nozzle;

a wire electrode stretched between the upper and lower wire guides;

a first group of motors configured to move the upper and lower wire guides;

a second group of motors configured to move the table;

a pump configured to jet machining liquid via the upper and lower nozzles to the workpiece on the table in the machining tank; and a controller connected to the first and second groups of motors and the pump by power and signal lines to obtain positions of the upper and lower wire guides and a position of the table, wherein the controller includes a processor configured to, control the first group of motors to move the upper and lower wire guides to cause the wire electrode to be moved with respect to the workpiece, or control the second group of motors to move the table to cause the workpiece to be moved with respect to the wire electrode, on the basis of a machining program in order to perform electric discharge machining of the workpiece by the wire electrode in the machining tank, wherein a shift is caused by wire bending of the wire electrode in a direction opposite to a movement direction of the wire electrode with respect to the workpiece due to machining liquid pressure and a discharge repulsive force generated during the electric discharge machining; and a memory configured to store, as reference positions, (i) sets of positions of the upper and lower wire guides in a workpiece thickness direction with respect to workpiece upper and lower surfaces of the workpiece and (ii) a thickness of the workpiece; and store correction amounts for correcting shift amounts between (a) wire guide coordinate positions on a machining program route in the reference positions and (b) actual machining positions on the workpiece upper and lower surfaces, wherein the processor is configured to set values corresponding to positions of the upper and lower wire guides in the workpiece thickness direction with respect to the workpiece upper and lower surfaces, and a value corresponding to the thickness of the workpiece, select a plurality of sets of the positions close to the set values corresponding to the positions of the upper and lower wire guides in the workpiece thickness direction with respect to the workpiece upper and lower surfaces and the set value corresponding to the thickness of the workpiece, from the stored sets of the positions of the upper and lower wire guides in the workpiece thickness direction with respect to the workpiece upper and lower surfaces and the stored thickness of the workpiece, calculate correction amounts, on the basis of the selected plurality of sets of reference positions and the stored correction amounts, for correcting the respective shift amounts in the set values corresponding to the positions of the upper and lower wire guides in the workpiece thickness direction with respect to the workpiece upper and lower surfaces and the set value corresponding to the thickness of the workpiece, correct positions of the upper and lower wire guides independently of each other, on the basis of the calculated correction amounts, and cause the wire electrode to move with respect to the workpiece according to the corrected positions of the upper and lower wire guides in a movement command of the upper and lower wire guides with respect to the table commanded by the machining program.

3. A wire electric discharge machine, comprising:

a machining tank;

a table configured to support a workpiece and disposed in the machining tank;

an upper wire guide including an upper nozzle;

a lower wire guide including a lower nozzle;

a wire electrode stretched between the upper and lower wire guides;

a first group of motors configured to move the upper and lower wire guides;

a second group of motors configured to move the table;

a pump configured to jet machining liquid via the upper and lower nozzles to the workpiece on the table in the machining tank; and a controller connected to the first and second groups of motors and the pump by power and signal lines to obtain positions of the upper and lower wire guides and a position of the table, wherein the controller includes a processor configured to, control the first group of motors to move the upper and lower wire guides to cause the wire electrode to be moved with respect to the workpiece, or control the second group of motors to move the table to cause the workpiece to be moved with respect to the wire electrode, on the basis of a machining program in order to perform electric discharge machining of the workpiece by the wire electrode in the machining tank, wherein a shift is caused by wire bending of the wire electrode in a direction opposite to a movement direction of the wire electrode with respect to the workpiece due to machining liquid pressure and a discharge repulsive force generated during the electric discharge machining; and a memory configured to store, as reference positions, (i) sets of positions of the upper and lower wire guides in workpiece thickness direction with respect to workpiece upper and lower surfaces of the workpiece and (ii) a thickness of the workpiece; and store correction amounts for correcting shift amounts between (a) wire guide coordinate positions on a machining program route in the reference positions and (b) actual machining positions on the workpiece upper and lower surfaces, wherein the processor is configured to set values corresponding to the sets of positions of the upper and lower wire guides in the workpiece thickness direction with respect to the workpiece upper and lower surfaces, and a value corresponding to the thickness of the workpiece, invoke correction amounts, from the stored reference positions and the stored correction amounts, for correcting the respective shift amounts in the set values corresponding to the sets of positions of the upper and lower wire guides in the workpiece thickness direction with respect to the workpiece upper and lower surfaces and the set value corresponding to the thickness of the workpiece, correct positions of the upper and lower wire guides independently of each other, on the basis of the invoked correction amounts, and cause the wire electrode to move with respect to the workpiece according to the corrected positions of the upper and lower wire guides in a movement command of the upper and lower wire guides with respect to the table commanded by the machining program.

4. A wire electric discharge machine, comprising:

a machining tank;

a table configured to support a workpiece and disposed in the machining tank;

an upper wire guide including an upper nozzle;

a lower wire guide including a lower nozzle;

a wire electrode stretched between the upper and lower wire guides;

a first group of motors configured to move the upper and lower wire guides;

a second group of motors configured to move the table;

a pump configured to jet machining liquid via the upper and lower nozzles to the workpiece on the table in the machining tank; and a controller connected to the first and second groups of motors and the pump by power and signal lines to obtain positions of the upper and lower wire guides and a position of the table, wherein the controller includes a processor configured to, control the first group of motors to move the upper and lower wire guides to cause the wire electrode to be moved with respect to the workpiece, or control the second group of motors to move the table to cause the workpiece to be moved with respect to the wire electrode, on the basis of a machining program in order to perform electric discharge machining of the workpiece by the wire electrode in the machining tank, wherein a shift is caused by wire bending of the wire electrode in a direction opposite to a movement direction of the wire electrode with respect to the workpiece due to machining liquid pressure and a discharge repulsive force generated during the electric discharge machining; and a memory configured to store, as a reference position, (i) positions of the upper and lower wire guides in a workpiece thickness direction with respect to workpiece upper and lower surfaces of the workpiece and (ii) a thickness of the workpiece, in a state in which the upper and lower wire guides respectively approach the workpiece upper and lower surfaces; and store shift amounts between (a) wire guide coordinate positions on a machining program route in the reference position and (b) actual machining positions on the workpiece upper and lower surfaces, wherein the processor is configured to calculate shift correction amounts from the stored shift amounts, set values corresponding to positions of the upper and lower wire guides in the workpiece thickness direction with respect to the workpiece upper and lower surfaces, and a value corresponding to the thickness of the workpiece, calculate correction amounts, on the basis of the stored reference position and the calculated shift correction amounts, for correcting the respective shift amounts in the set values corresponding to the positions of the upper and lower wire guides in the workpiece thickness direction with respect to the workpiece upper and lower surfaces and the set value corresponding to the thickness of the workpiece, correct positions of the upper and lower wire guides independently of each other, on the basis of the calculated correction amounts, and cause the wire electrode to move with respect to the workpiece according to the corrected positions of the upper and lower wire guides in a movement command of the upper and lower wire guides with respect to the table commanded by the machining program.

5. A wire electric discharge machine, comprising:

a machining tank;

a table configured to support a workpiece and disposed in the machining tank;

an upper wire guide including an upper nozzle;

a lower wire guide including a lower nozzle;

a wire electrode stretched between the upper and lower wire guides;

a first group of motors configured to move the upper and lower wire guides;

a second group of motors configured to move the table;

a pump configured to jet machining liquid via the upper and lower nozzles to the workpiece on the table in the machining tank; and a controller connected to the first and second groups of motors and the pump by power and signal lines to obtain positions of the upper and lower wire guides and a position of the table, wherein the controller includes a processor configured to, control the first group of motors to move the upper and lower wire guides to cause the wire electrode to be moved with respect to the workpiece, or control the second group of motors to move the table to cause the workpiece to be moved with respect to the wire electrode, on the basis of a machining program in order to perform electric discharge machining of the workpiece by the wire electrode in the machining tank, wherein a shift is caused by wire bending of the wire electrode in a direction opposite to a movement direction of the wire electrode with respect to the workpiece due to machining liquid pressure and a discharge repulsive force generated during the electric discharge machining; and a memory configured to store, as reference positions, (i) sets of positions of the upper and lower wire guides in a workpiece thickness direction with respect to workpiece upper and lower surfaces of the workpiece and (ii) a thickness of the workpiece; and store shift amounts between (a) wire guide coordinate positions on a machining program route in a plurality of the reference positions and (b) actual machining positions on the workpiece upper and lower surfaces, wherein the processor is configured to calculate shift correction amounts from the stored shift amounts, set values corresponding to positions of the upper and lower wire guides in the workpiece thickness direction with respect to the workpiece upper and lower surfaces, and a value corresponding to the thickness of the workpiece, select a plurality of sets of the positions of the upper and lower wire guides close to the set values corresponding to the positions of the upper and lower wire guides in the workpiece thickness direction with respect to the workpiece upper and lower surfaces and the set value corresponding to the thickness of the workpiece, from the stored sets of the positions of the upper and lower wire guides in the workpiece thickness direction with respect to the workpiece upper and lower surfaces and the stored thickness of the workpiece, calculate correction amounts, on the basis of the selected plurality of sets of the positions and the calculated shift correction amounts, for correcting the respective shift amounts in the set values corresponding to the positions of the upper and lower wire guides in the workpiece thickness direction with respect to the workpiece upper and lower surfaces and the set value corresponding to the thickness of the workpiece, correct positions of the upper and lower wire guides independently of each other, on the basis of the invoked correction amounts, and cause the wire electrode to move with respect to the workpiece according to the corrected positions of the upper and lower wire guides in a movement command of the upper and lower wire guides with respect to the table commanded by the machining program.

6. A wire electric discharge machine, comprising:
a machining tank;
a table configured to support a workpiece and disposed in the machining tank;
an upper wire guide including an upper nozzle;
a lower wire guide including a lower nozzle;
a wire electrode stretched between the upper and lower wire guides;
a first group of motors configured to move the upper and lower wire guides;
a second group of motors configured to move the table;
a pump configured to jet machining liquid via the upper and lower nozzles to the workpiece on the table in the machining tank; and a controller connected to the first and second groups of motors and the pump by power and signal lines to obtain positions of the upper and lower wire guides and a position of the table, wherein the controller includes a processor configured to, control the first group of motors to move the upper and lower wire guides to cause the wire electrode to be moved with respect to the workpiece, or control the second group of motors to move the table to cause the workpiece to be moved with respect to the wire electrode, on the basis of a machining program in order to perform electric discharge machining of the workpiece by the wire electrode in the machining tank, wherein a shift is caused by wire bending of the wire electrode in a direction opposite to a movement direction of the wire electrode with respect to the workpiece due to machining liquid pressure and a discharge repulsive force generated during the electric discharge machining; and a memory configured to store, as reference positions, (i) sets of positions of the upper and lower wire guides in workpiece thickness direction with respect to workpiece upper and lower surfaces of the workpiece and (ii) a thickness of the workpiece; and store shift amounts between (a) wire guide coordinate positions on a machining program route in the reference positions and (b) actual machining positions on the workpiece upper and lower surfaces, wherein the processor is configured to calculate shift correction amounts from the stored shift amounts, set values corresponding to positions of the upper and lower wire guides in the workpiece thickness direction with respect to the workpiece upper and lower surfaces, and a value corresponding to the thickness of the workpiece, invoke correction amounts, from the stored reference positions and the calculated shift correction amounts, for correcting the respective shift amounts in the set values corresponding to the positions of the upper and lower wire guides in the workpiece thickness direction with respect to the workpiece upper and lower surfaces and the set value corresponding to the thickness of the workpiece, correct positions of the upper and lower wire guides independently of each other, on the basis of the invoked correction amounts, and cause the wire electrode to move with respect to the workpiece according to the corrected positions of the upper and lower wire guides in a movement command of the upper and lower wire guides with respect to the table commanded by the machining program.

7. The wire electric discharge machine according to claim 1, wherein the memory is configured to store a plurality of sets of positions of the upper and lower wire guides and the positions of the upper and lower wire guides in the workpiece thickness direction with respect to the workpiece upper and lower surfaces, instead of storing the positions of the upper and lower wire guides in the workpiece thickness direction with respect to the workpiece upper and lower surfaces.

8. The wire electric discharge machine according to claim 2, wherein the memory is configured to store a plurality of sets of positions of the upper and lower wire guides and the positions of the upper and lower wire guides in the workpiece thickness direction with respect to the workpiece upper and lower surfaces, instead of storing the sets of positions of the upper and lower wire guides in the workpiece thickness direction with respect to the workpiece upper and lower surfaces.

9. The wire electric discharge machine according to claim 3, wherein the memory is configured to store a plurality of sets of positions of the upper and lower wire guides and the positions of the upper and lower wire guides in the workpiece thickness direction with respect to the workpiece upper and lower surfaces, instead of storing the sets of positions of the upper and lower wire guides in the workpiece thickness direction with respect to the workpiece upper and lower surfaces.

10. The wire electric discharge machine according to claim 4, wherein the memory is configured to store a plurality of sets of positions of the upper and lower wire guides and the positions of the upper and lower wire guides in the workpiece thickness direction with respect to the workpiece upper and lower surfaces, instead of storing the positions of the upper and lower wire guides in the workpiece thickness direction with respect to the workpiece upper and lower surfaces.

11. The wire electric discharge machine according to claim 5, wherein the memory is configured to store a plurality of sets of positions of the upper and lower wire guides and the positions of the upper and lower wire guides in the workpiece thickness direction with respect to the workpiece upper and lower surfaces, instead of storing the sets of positions of the upper and lower wire guides in the workpiece thickness direction with respect to the workpiece upper and lower surfaces.

12. The wire electric discharge machine according to claim 6, wherein the memory is configured to store a plurality of sets of positions of the upper and lower wire guides and the positions of the upper and lower wire guides in the workpiece thickness direction with respect to the workpiece upper and lower surfaces, instead of storing the sets of positions of the upper and lower wire guides in the workpiece thickness direction with respect to the workpiece upper and lower surfaces.

13. The wire electric discharge machine according to claim 1, wherein when the upper wire guide is moved upward or downward in the workpiece thickness direction,
the processor is configured to, by acquiring a value of the movement of the upper wire guide in the workpiece thickness direction, calculate a distance from the upper wire guide to the lower wire guide in association with the position of the upper wire guide in the workpiece thickness direction, and the memory is configured to store the calculated distance.

* * * * *